US010582495B2

(12) United States Patent
Cai et al.

(10) Patent No.: US 10,582,495 B2
(45) Date of Patent: Mar. 3, 2020

(54) DATA SENDING AND RECEIVING METHOD, APPARATUS, AND SYSTEM

(71) Applicant: Huawei Technologies Co., Ltd., Shenzhen (CN)

(72) Inventors: Meng Cai, Chengdu (CN); Hongli Jiang, Chengdu (CN); Kun Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 15/964,979

(22) Filed: Apr. 27, 2018

(65) Prior Publication Data

US 2018/0249466 A1 Aug. 30, 2018

Related U.S. Application Data

(63) Continuation of application No. PCT/CN2015/093259, filed on Oct. 29, 2015.

(51) Int. Cl.
*H04W 72/04* (2009.01)
*H04L 27/36* (2006.01)
(Continued)

(52) U.S. Cl.
CPC ....... *H04W 72/0446* (2013.01); *H04L 27/362* (2013.01); *H04W 88/085* (2013.01);
(Continued)

(58) Field of Classification Search
CPC .................................................. H04W 88/085; H04W 72/0446; H04W 92/12
See application file for complete search history.

(56) References Cited

U.S. PATENT DOCUMENTS 8,229,416 B2 7/2012 Akman et al.
2007/0147488 A1* 6/2007 Han ...................... H03D 3/006
375/222
(Continued)

FOREIGN PATENT DOCUMENTS

CN 1860811 A 11/2006
CN 200966063 Y 10/2007
(Continued)

OTHER PUBLICATIONS

"Common Public Radio Interface (CPRI); Interface Specification," CPRI Specification V6.1, Interface Specification, Jul. 1, 2014, 129 pages.
(Continued)

*Primary Examiner* — Hassan Kizou
*Assistant Examiner* — Hector Reyes
(74) *Attorney, Agent, or Firm* — Slater Matsil, LLP

(57) ABSTRACT

Embodiments of the present invention provide a data sending and receiving method, an apparatus, and a system. The method can be executed by a microwave device, which includes: obtaining a control word (CW) and a first antenna-carrier (A×C) from a common public radio interface (CPRI) frame; modulating the CW to obtain in-phase/quadrature (I/Q) data of the CW; determining a first timeslot in which the first A×C does not carry antenna-carrier I/Q data; writing a preset synchronization sequence, first information, and a random number in the first timeslot to generate a second A×C; and combining the second A×C with the I/Q data of the CW to generate a microwave air interface frame, and sending the microwave air interface frame in a time division multiplexing manner.

16 Claims, 20 Drawing Sheets

(51) Int. Cl.
*H04W 88/08* (2009.01)
*H04L 27/34* (2006.01)
*H04L 7/04* (2006.01)
*H04J 3/00* (2006.01)
*H04L 25/02* (2006.01)

(52) U.S. Cl.
CPC . *H04J 3/00* (2013.01); *H04L 7/04* (2013.01); *H04L 25/0202* (2013.01); *H04L 27/34* (2013.01)

(56) References Cited

U.S. PATENT DOCUMENTS

| | | | |
|---|---|---|---|
| 2008/0225816 A1* | 9/2008 | Osterling | H04W 88/08 370/342 |
| 2011/0171902 A1 | 7/2011 | Toyoda et al. | |
| 2014/0378047 A1 | 12/2014 | Kennard et al. | |
| 2015/0016445 A1* | 1/2015 | Garg | H04L 47/622 370/350 |
| 2015/0180626 A1* | 6/2015 | Hao | H04L 5/0044 370/329 |
| 2016/0308641 A1* | 10/2016 | Zeng | H04B 10/25753 |
| 2016/0373283 A1* | 12/2016 | Zeng | H04L 27/2623 |

FOREIGN PATENT DOCUMENTS

| | | |
|---|---|---|
| CN | 101715214 A | 5/2010 |
| CN | 102118191 A | 7/2011 |

OTHER PUBLICATIONS

Checko, A. et al., "Cloud RAN for Mobile Networks—A Technology Overview," IEEE Communication Surveys & Tutorials, vol. 17, No. 1, First Quarter 2015, pp. 405-426.

"Common Public Radio Interface (CPRI); Interface Specification," CPRI Specification V7.0 (Oct. 9, 2015), 128 pages.

* cited by examiner

CONT. FROM FIG. 6A

CONT. FROM FIG. 6A

S107. The first microwave device sends the microwave air interface frame to a second microwave device S108. The second microwave device receives the microwave air interface frame from a microwave air interface, and obtains the second antenna-carrier AxC and the I/Q data of the control word CW from the microwave air interface frame, where the second AxC includes at least the first information and the preset synchronization sequence S109. The second microwave device demodulates the I/Q data of the CW to generate the CW S110. The second microwave device performs autocorrelation computation on the second AxC by using the preset synchronization sequence, and extracts the first information to obtain the first AxC S111. The second microwave device recombines the CW and the first AxC to generate CPRI data, and sends the CPRI data

FIG. 6B

CONT. FROM FIG. 11A

CONT. FROM FIG. 11A

S104y. The first microwave device determines the first timeslot according to a preset uplink-downlink subframe configuration and the starting location of the first timeslot S105. The first microwave device writes a preset synchronization sequence, first information, and a random number in the first timeslot to generate a second AxC S106. The first microwave device combines the second AxC with the I/Q data of the CW to generate a microwave air interface frame S107. The first microwave device sends the microwave air interface frame to a second microwave device S108. The second microwave device receives the microwave air interface frame from a microwave air interface, and obtains the second antenna-carrier AxC and the I/Q data of the control word CW from the microwave air interface frame, where the second AxC includes at least the first information and the preset synchronization sequence S109. The second microwave device demodulates the I/Q data of the CW to generate the CW S110. The second microwave device performs autocorrelation computation on the second AxC by using the preset synchronization sequence, and extracts the first information to obtain the first AxC S111. The second microwave device recombines the CW and the first AxC to generate CPRI data, and sends the CPRI data

FIG. 11B

DATA SENDING AND RECEIVING METHOD, APPARATUS, AND SYSTEM

CROSS-REFERENCE TO RELATED APPLICATIONS

This application is a continuation of International Application No. PCT/CN2015/093259, filed on Oct. 29, 2015, the disclosure of which is hereby incorporated by reference in its entirety.

TECHNICAL FIELD

Embodiments of the present invention relate to the communications field, and in particular, to a data sending and receiving method, an apparatus, and a system.

BACKGROUND

Data transmitted between a baseband unit (BBU) and a remote radio unit (RRU) in a distributed base station includes common information and radio signal information. The common information and the radio signal information may constitute digital fronthaul data in a wireless network according to a standard open interface protocol, and the digital fronthaul data is transmitted in both directions between the BBU and the RRU by using an optical fiber or a cable. The radio signal information may carry one or more pieces of antenna-carrier in-phase/quadrature (I/Q) data.

When the standard open interface protocol is a common public radio interface (CPRI), the digital fronthaul data is referred to as a CPRI frame. In this case, the common information is referred to as a control word (CW), and the radio signal information is referred to as an antenna-carrier (A×C).

In a current system, the CPRI frame is transmitted in a bit transparent transmission manner. Specifically, a transmit end first uses the CPRI frame as a bit stream and encapsulates and maps the CPRI frame to a microwave frame payload to form a microwave air interface frame, then performs IQ modulation and up-conversion on the formed microwave air interface frame to form a microwave radio frequency signal, and finally sends the formed microwave radio frequency signal to a receive end using a microwave air interface. However, as a transmission rate of the CPRI frame increases, microwave signal bandwidth required for transmitting the CPRI frame in the bit transparent transmission manner rapidly increases. Consequently, frequency spectrum utilization is reduced.

A transmit end in an Radio over Radio (ROR)/Analog Radio over Fiber (AROF) system can perform analogue transmission on antenna-carrier I/Q data carried by an A×C in a CPRI frame by directly using a microwave, so as to increase frequency spectrum utilization. However, in the ROR/AROF system, neither the transmit end nor a receive end can learn of an LTE uplink-downlink handover timeslot. Therefore, neither the transmit end nor the receive end in the ROR/AROF system can learn of a transmission timeslot of antenna-carrier I/Q data. In this case, in a transmission timeslot in which an A×C does not carry antenna-carrier I/Q data, power of the A×C sent by the transmit end is extremely low or even zero, so that automatic gain control (AGC) of the receive end automatically amplifies a received CPRI frame. However, in a transmission timeslot in which the A×C includes I/Q data, a gain of the AGC of the receive end sharply decreases because the CPRI frame does not need to be amplified. This causes relatively large jitter of an mean square error (MSE) curve of a microwave link. Consequently, system performance may be reduced.

SUMMARY

Embodiments of the present invention provide a data transmission method, an apparatus, and a system. In some embodiments, a problem is resolved that relatively large fluctuation in an MSE curve of a microwave link causes low system performance.

To achieve the foregoing objective, the embodiments of the present invention use the following technical solutions.

According to a first aspect, an embodiment of the present invention provides a data sending method. The method includes receiving, by a first microwave device, a common public radio interface (CPRI) frame, and obtaining a control word (CW) and a first antenna-carrier (A×C) from the CPRI frame. The method also includes modulating, by the first microwave device, the CW to obtain in-phase/quadrature I/Q data of the CW. The method also includes determining, by the first microwave device, a first timeslot, where the first timeslot is a timeslot in which the first A×C does not carry antenna-carrier I/Q data. The method also includes writing, by the first microwave device, a preset synchronization sequence, first information, and a random number in the first timeslot to generate a second A×C. The first information includes at least one of a preset channel estimate or a preset radio frequency weighted matrix of the first microwave device. The method also includes combining, by the first microwave device, the second A×C with the I/Q data of the CW to generate a microwave air interface frame, and sending the microwave air interface frame in a time division multiplexing manner.

According to the data sending method provided in this embodiment of the present invention, after obtaining the first A×C and the CW from the CPRI frame received by the first microwave device, the first microwave device determines the first timeslot in which the first A×C does not carry antenna-carrier I/Q data, and writes the preset synchronization sequence, the first information, and the random number in the first timeslot to generate the second A×C, so that power of the second A×C is relatively high as a whole. In addition, the first microwave device modulates the CW to obtain the in-phase/quadrature I/Q data of the CW. Then, the first microwave device combines the second A×C with the I/Q data of the CW to generate the microwave air interface frame, and sends the microwave air interface frame in the time division multiplexing manner, so that the second A×C and the I/Q data of the CW can be transmitted through one microwave channel. Because the power of the second A×C is improved as a whole, after the second microwave device that is opposite to the first microwave device receives the microwave air interface frame, an AGC gain of the second microwave device may not increase or decrease sharply, that is, fluctuation in the AGC gain of the second microwave device is reduced, thereby reducing fluctuation in an MSE curve of a microwave link, and improving system performance.

In a first possible implementation of the first aspect, the CW includes a preset timeslot identifier, the timeslot identifier includes a first timeslot identifier that indicates the first timeslot and/or a second timeslot identifier that indicates a second timeslot, and the second timeslot is a timeslot in which the first A×C carries antenna-carrier I/Q data. The determining, by the first microwave device, a first timeslot includes: extracting, by the first microwave device, the timeslot identifier from the CW; and determining, by the first microwave device, the first timeslot according to the timeslot identifier.

In this embodiment of the present invention, the first microwave device may determine the first timeslot in multiple different manners. One of the manners may be presetting a timeslot identifier in the CW. In this scenario, the microwave device can directly read the preset timeslot identifier to determine the first timeslot. In this way, the microwave device can quickly determine the first timeslot, and the microwave device does not need to perform a large quantity of processing procedures.

In a second possible implementation of the first aspect, the determining, by the first microwave device, a first timeslot includes: computing, by the first microwave device, an attribute of the first A×C, where the attribute includes power or a frequency spectrum of the first A×C; determining, by the first microwave device, a moment at which a value of the attribute is less than a second preset threshold as a starting location of the first timeslot; and determining, by the first microwave device, the first timeslot according to a preset uplink-downlink subframe configuration and the starting location of the first timeslot.

The first microwave device directly computes the power or the frequency spectrum of the first A×C received by the first microwave device, determines the starting location of the first timeslot according to the power or the frequency spectrum obtained through computation, and further determines the first timeslot according to the preset uplink-downlink subframe configuration and the starting location of the first timeslot. In this way, the determined first timeslot can meet a feature of the CPRI frame received by the first microwave device, and the determined first timeslot is relatively accurate.

With reference to the second possible implementation of the first aspect, in a third possible implementation of the first aspect, the attribute is the power. The determining, by the first microwave device, a starting location of the first timeslot includes: determining, by the first microwave device, whether a value of the power is less than a third preset threshold, where the third preset threshold is greater than the second preset threshold; if the value of the power is less than the third preset threshold, recording, by the first microwave device, a first moment, and computing power of n consecutive pieces of data starting from the first moment in the first A×C, where the first moment is a moment at which the value of the power is less than the third preset threshold, and n is a positive integer; determining, by the first microwave device, whether power values of the n consecutive pieces of data are less than the second preset threshold; and if the power values of the n consecutive pieces of data are less than the second preset threshold, determining, by the first microwave device, a moment in a first time period as the starting location of the first timeslot, where the first time period is a time period starting from the first piece of data to the last piece of data in the n consecutive pieces of data.

If the first microwave device computes the power of the first A×C received by the first microwave device, and determines the first timeslot according to the value of the power obtained through computation, the first microwave device needs to set the second preset threshold and the third preset threshold, and the third preset threshold is greater than the second preset threshold.

To prevent a false negative, the first microwave device first determines whether the value of the power is less than the third preset threshold, and determines the moment at which the value of the power is less than the third preset threshold as the first moment. In actual application, there may be data with extremely low power in antenna-carrier I/Q data carried by the first A×C. A difference between power of these data and power of the first A×C that does not carry antenna-carrier I/Q data is extremely small. Therefore, to prevent a false positive, the first microwave device further needs to compute the power of the n consecutive pieces of data starting from the first moment in the first A×C, and determine whether the power values of the n consecutive pieces of data are less than the second preset threshold. After two judgments, the first timeslot determined by the first microwave device can more meet the feature of the CPRI frame received by the first microwave device, and the determined first timeslot is relatively accurate.

According to a second aspect, an embodiment of the present invention provides a data receiving method. The method includes receiving, by a second microwave device, a microwave air interface frame from a microwave air interface. The method also includes obtaining, by the second microwave device, a second antenna-carrier (A×C) and in-phase/quadrature (I/Q) data of a control word (CW) from the microwave air interface frame, where the second A×C includes at least first information and a preset synchronization sequence, the first information includes at least one of a preset channel estimate or a preset radio frequency weighted matrix of a first microwave device. The method also includes demodulating, by the second microwave device, the I/Q data of the CW to generate the CW. The method also includes performing, by the second microwave device, autocorrelation computation on the second A×C by using the preset synchronization sequence, and extracting the first information to generate a first A×C. The method also includes recombining, by the second microwave device, the CW and the first A×C to generate a common public radio interface (CPRI) frame, and sending the CPRI frame.

According to the data receiving method provided in this embodiment of the present invention, the second A×C is generated after the first microwave device writes the preset synchronization sequence, the first information, and a random number in a first timeslot in which the first A×C does not carry I/Q data, and power of these written data is relatively high. Therefore, power of the second A×C in the microwave air interface frame sent by the first microwave device is also improved. When the second microwave device obtains the second A×C and the I/Q data of the CW from the microwave air interface frame, an AGC gain of the second microwave device may not increase or decrease sharply, so that fluctuation in the AGC gain of the second microwave device is reduced, thereby reducing fluctuation in an MSE curve of a microwave link, and improving system performance.

According to a third aspect, an embodiment of the present invention provides a microwave device. The microwave device is a first microwave device. The first microwave device includes: a receiving unit, configured to receive a common public radio interface CPRI frame. The first microwave device also includes an obtaining unit, configured to obtain a control word (CW) and a first antenna-carrier (A×C) from the CPRI frame received by the receiving unit. The first microwave device also includes a modulation unit, configured to modulate the CW obtained by the obtaining unit to obtain in-phase/quadrature (I/Q) data of the CW. The first microwave device also includes a determining unit, configured to determine a first timeslot, where the first timeslot is a timeslot in which the first A×C does not carry antenna-carrier I/Q data. The first microwave device also includes a write unit, configured to write a preset synchronization sequence, first information, and a random number in the first timeslot determined by the determining unit to generate a second A×C, where the first information includes at least one of a preset channel estimate or a preset radio frequency weighted matrix of the first microwave device; a microwave air interface frame framing unit, configured to combine the second A×C generated by the write unit with the I/Q data of the CW obtained by the modulation unit to generate a microwave air interface frame. The first microwave device also includes a microwave transmitting unit, configured to send, in a time division multiplexing manner, the microwave air interface frame generated by the microwave air interface frame framing unit.

For a technical effect of the microwave device provided in this embodiment of the present invention, refer to the technical effect of the first microwave device described in the data sending method performed by the first microwave device in the foregoing first aspect. Details are not described herein.

In a first possible implementation of the third aspect, the CW includes a preset timeslot identifier, the timeslot identifier includes a first timeslot identifier and/or a second timeslot identifier, the first timeslot identifier is used to indicate the first timeslot, the second timeslot identifier is used to indicate a second timeslot, and the second timeslot is a timeslot in which the first A×C carries antenna-carrier I/Q data. The first microwave device further includes an extraction unit, where the extraction unit is configured to extract the timeslot identifier from the CW obtained by the obtaining unit. The determining unit is configured to determine the first timeslot according to the timeslot identifier extracted by the extraction unit.

For a technical effect herein, refer to the technical effect of the first microwave device described in the data sending method performed by the first microwave device in the first possible implementation of the foregoing first aspect. Details are not described herein.

In a second possible implementation of the third aspect, the first microwave device further includes a computation unit. The computation unit is further configured to compute an attribute of the first A×C received by the receiving unit, where the attribute includes power or a frequency spectrum of the first A×C. The determining unit is configured to determine a moment at which a value of the attribute computed by the computation unit is less than a second preset threshold as a starting location of the first timeslot, and configured to determine the first timeslot according to a preset uplink-downlink subframe configuration and the starting location of the first timeslot.

For a technical effect herein, refer to the technical effect of the first microwave device described in the data sending method performed by the first microwave device in the second possible implementation of the foregoing first aspect. Details are not described herein.

With reference to the second possible implementation of the third aspect, in a third possible implementation of the third aspect, the attribute is the power. The first microwave device further includes a judging unit, where the judging unit is configured to determine whether a value of the power computed by the computation unit is less than a third preset threshold, where the third preset threshold is greater than the second preset threshold. The computation unit is further configured to: if the judging unit determines that the value of the power is less than the third preset threshold, record a first moment, and compute power of n consecutive pieces of data starting from the first moment in the first A×C, where the first moment is a moment at which the value of the power is less than the third preset threshold, and n is a positive integer. The judging unit is further configured to determine whether power values that are of the n consecutive pieces of data and that are computed by the computation unit are less than the second preset threshold. The determining unit is configured to, if the judging unit determines that the power values of the n consecutive pieces of data are less than the second preset threshold, determine a moment in a first time period as the starting location of the first timeslot, where the first time period is a time period starting from the first piece of data to the last piece of data in the n consecutive pieces of data.

For a technical effect herein, refer to the technical effect of the first microwave device described in the data sending method performed by the first microwave device in the third possible implementation of the foregoing first aspect. Details are not described herein.

According to a fourth aspect, an embodiment of the present invention provides a microwave device. The microwave device is a second microwave device. The second microwave device includes: a microwave receiving unit, configured to receive a microwave air interface frame from a microwave air interface. The second microwave device also includes a microwave air interface frame parsing unit, configured to obtain a second antenna-carrier (A×C) and in-phase/quadrature (I/Q) data of a control word (CW) from the microwave air interface frame received by the microwave receiving unit, where the second A×C includes at least first information and a preset synchronization sequence, the first information includes at least one of a preset channel estimate or a preset radio frequency weighted matrix of a first microwave device; a demodulation unit, configured to demodulate the I/Q data of the CW obtained by the microwave air interface frame parsing unit to generate the CW. The second microwave device also includes a processing unit, configured to perform autocorrelation computation on the second A×C using the preset synchronization sequence obtained by the microwave air interface frame parsing unit by parsing, and extract the first information to generate a first A×C. The second microwave device also includes a recombination unit, configured to recombine the CW generated by the demodulation unit and the first A×C generated by the processing unit to generate a common public radio interface (CPRI) frame, and send the CPRI frame.

For a technical effect of the microwave device provided in this embodiment of the present invention, refer to the technical effect of the second microwave device described in the data receiving method performed by the second microwave device in the foregoing second aspect. Details are not described herein.

According to a fifth aspect, an embodiment of the present invention provides a microwave device, including a receiver, a processor, a transmitter, a memory, and a system bus. The memory is configured to store a computer execution instruction. The receiver, the transmitter, the memory, and the processor are connected to the system bus. When the microwave device runs, the processor executes the computer execution instruction stored in the memory, so that the microwave device performs the data sending method according to any one of the first aspect or the optional implementations of the first aspect.

According to a sixth aspect, an embodiment of the present invention provides a microwave device, including a receiver, a processor, a transmitter, a memory, and a system bus. The memory is configured to store a computer execution instruction. The receiver, the transmitter, the memory, and the processor are connected to the system bus. When the microwave device runs, the processor executes the computer execution instruction stored in the memory, so that the microwave device performs the data receiving method according to any one of the second aspect or the optional implementations of the second aspect.

According to a seventh aspect, an embodiment of the present invention provides a data transmission system, including the microwave device according to any one of the third aspect or the optional implementations of the third aspect, and the microwave device according to any one of the fourth aspect or the optional implementations of the fourth aspect; or the microwave device according to any one of the fifth aspect or the optional implementations of the fifth aspect, and the microwave device according to any one of the sixth aspect or the optional implementations of the sixth aspect.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention.

FIG. 6A and FIG. 6B are a schematic flowchart 1 of a data sending and receiving method according to an embodiment of the present invention;

FIG. 11A and FIG. 11B are a schematic flowchart 5 of a data sending and receiving method according to an embodiment of the present invention;

DETAILED DESCRIPTION OF ILLUSTRATIVE EMBODIMENTS

Figure 1:
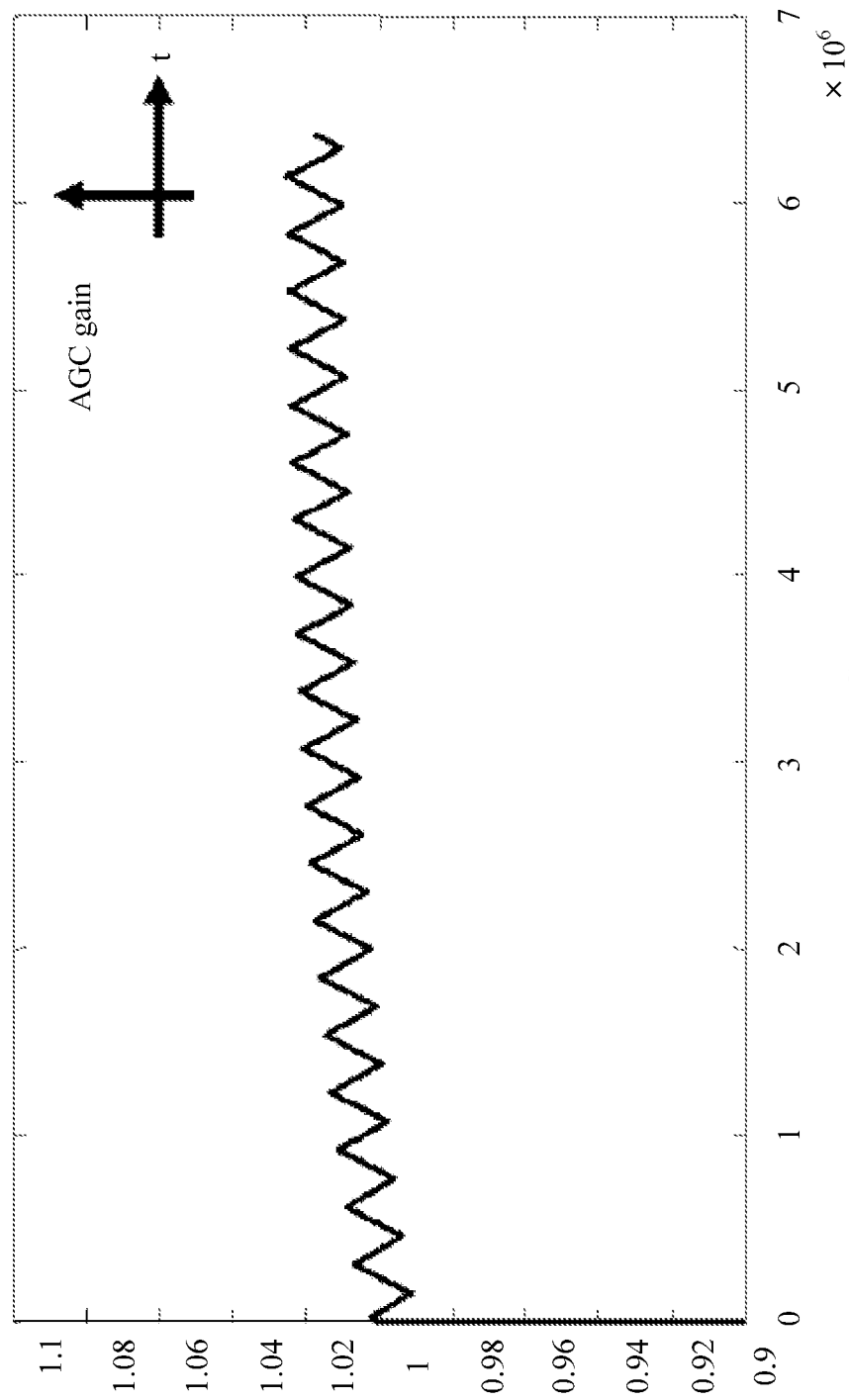
FIG. 1 is a schematic diagram of an AGC gain curve of a receive end in a CPRI frame transmission process in a current system.

The following describes the technical solutions in the embodiments of the present invention with reference to the accompanying drawings in the embodiments of the present invention. Apparently, the described embodiments are merely some but not all of the embodiments of the present invention.

In the following description, to illustrate rather than limit, specific details such as a particular system structure, an interface, and a technology are provided to make a thorough understanding of the present invention. However, a person skilled in the art should know that the present invention may be practiced in other embodiments without these specific details. In other cases, detailed descriptions of well-known apparatuses, circuits, and methods are omitted, so that the present invention is described without being obscured by unnecessary details.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that ordinal numbers such as "first" and "second", if mentioned in the embodiments of the present invention, are only used for distinguishing, unless the ordinal numbers definitely represent a sequence according to the context.

It is known to all that a core concept of a structure of a distributed base station is separating a BBU and an RRU that are of a conventional macro base station, and the BBU and the RRU are connected using an optical fiber or a cable. Data transmitted between the BBU and the RRU may be referred to as digital fronthaul data (the digital fronthaul data may include common information and radio signal information). That is, the digital fronthaul data may be transmitted in both directions between the BBU and the RRU using an optical fiber or a cable. In addition, with development of radio access technologies, a transmission rate of digital fronthaul data becomes increasingly high and may be higher in the future, and because of large bandwidth and a high rate of an optical fiber, the optical fiber is usually used in the industry to transmit the digital fronthaul data.

The common information and the radio signal information may constitute the digital fronthaul data according to a CPRI protocol. In this case, the digital fronthaul data is referred to as a CPRI frame.

In a current system, the CPRI frame is transmitted in a bit transparent transmission manner. However, in this transmission manner, as a transmission rate of the CPRI frame increases, microwave signal bandwidth required for transmitting the CPRI frame rapidly increases. Consequently, frequency spectrum utilization is reduced.

To increase the frequency spectrum utilization, the CPRI frame may be transmitted by using an ROR/AROF system. Specifically, a transmit end can perform analogue transmission on antenna-carrier I/Q data in the CPRI frame by directly using a microwave, so as to increase the frequency spectrum utilization. However, neither the transmit end nor a receive end in the ROR/AROF system can learn of a transmission timeslot of antenna-carrier I/Q data. Therefore, uplink-downlink handover cannot be performed well. This causes relatively large fluctuation in an AGC gain of the receive end, and further causes relatively large jitter of an MSE curve of a microwave link. Consequently, system performance is reduced.

Figure 2:
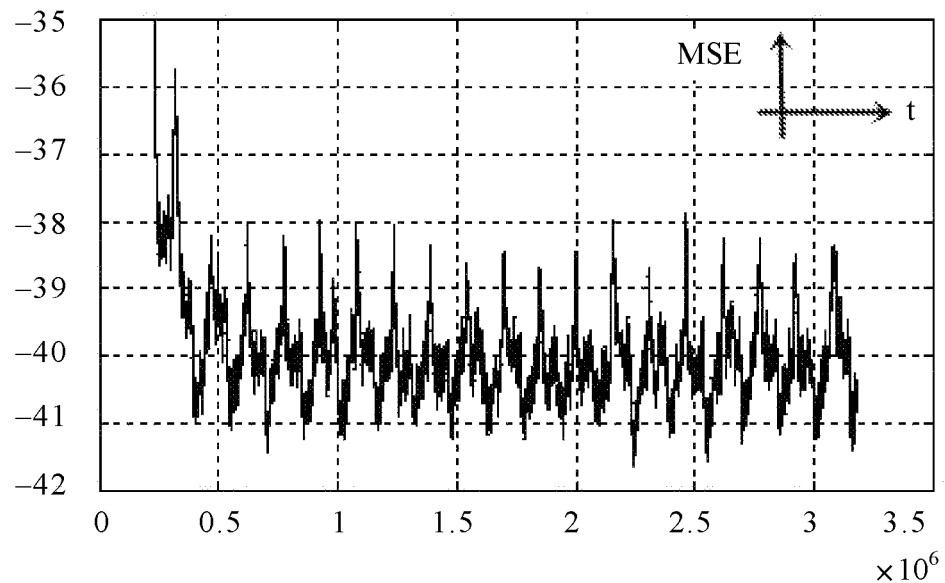
FIG. 2 is a schematic diagram of an MSE curve of a microwave link in a current CPRI frame transmission process.

For example, FIG. 1 shows an AGC gain curve of a receive end when an ROR/AROF system transmits a CPRI frame in the prior art. In FIG. 1, a horizontal coordinate represents time t, and a vertical coordinate represents an AGC gain. FIG. 2 shows an MSE curve of a microwave link when an ROR/AROF system transmits a CPRI frame in the prior art. In FIG. 2, a horizontal coordinate represents time t, and a vertical coordinate represents an MSE. It can be learned from FIG. 2 that jitter of the MSE exceeds 3 dB. When AGC jitters, an equalizer of a receive end needs some time to perform convergence. Therefore, the MSE curve in FIG. 2 is sawtooth.

Figure 3:
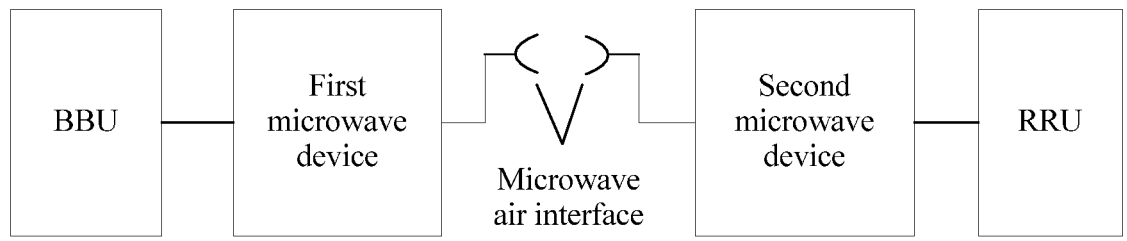
FIG. 3 is a diagram of a system architecture to which a method provided in an embodiment of the present invention is applied according to the present invention.

As shown in FIG. 3, the embodiments of the present invention provide a diagram of a system architecture to which a method provided in an embodiment of the present invention is applied, where the system may include a microwave device, a BBU, and an RRU. The microwave device is located between the BBU and the RRU, and the microwave device may include a first microwave device and a second microwave device. In addition, for ease of description, as shown in FIG. 3, in the embodiments of the present invention, a microwave device connected to the BBU is referred to as the first microwave device, and a microwave device connected to the RRU is referred to as the second microwave device.

In the system architecture shown in FIG. 3, in a possible implementation, the first microwave device may receive a CPRI frame that includes a first A×C and a CW from the BBU, convert the received CPRI frame into a microwave radio frequency signal, and then send the microwave radio frequency signal to the second microwave device by using a microwave air interface. In this case, the second microwave device may receive the microwave radio frequency signal from the microwave air interface, restore the CPRI frame according to the received microwave radio frequency signal, and then send the CPRI frame to the RRU. In addition, alternatively, the microwave device may be integrated into the BBU and/or the RRU. Correspondingly, in this implementation, when the second microwave device is integrated into the RRU, the second microwave device may directly transmit the obtained first A×C to a radio frequency sending unit of the RRU, and transmit the obtained CW to a control management unit of the RRU, instead of recombining the CPRI frame.

It should be noted that, in the embodiments of the present invention, roles of the second microwave device and the first microwave device may be interchanged. That is, in the system architecture shown in FIG. 3, in another possible implementation, the second microwave device may receive a CPRI frame that includes a first A×C and a CW from the RRU, convert the received CPRI frame into a microwave radio frequency signal, and then send the microwave radio frequency signal to the first microwave device by using a microwave air interface. In this case, the first microwave device may receive the microwave radio frequency signal from the microwave air interface, restore the CPRI frame according to the received microwave radio frequency signal, and then send the CPRI frame to the BBU. In addition, when the first microwave device is integrated into the BBU, the first microwave device may directly transmit the obtained first A×C to a baseband processing unit of the BBU, and transmit the obtained CW to a control management unit of the BBU, instead of recombining the CPRI frame.

Figure 4:
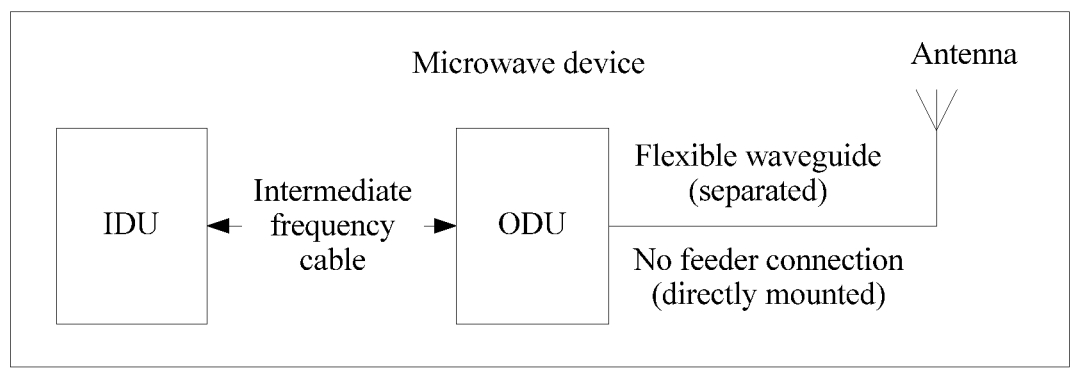
FIG. 4 is a schematic structural diagram of a microwave device according to an embodiment of the present invention.

It can be easily understood that both the first microwave device and the second microwave device in the embodiments of the present invention belong to a microwave device. As shown in FIG. 4, the microwave device may include three hardware modules: an indoor unit (IDU), an outdoor unit (ODU), and an antenna. The IDU may be configured to modulate a baseband signal to obtain an intermediate frequency signal, or may be configured to demodulate an intermediate frequency signal to obtain a baseband signal. The ODU may be configured to perform processing such as up-conversion and filtering on an intermediate frequency signal to obtain a radio frequency signal, or may be configured to perform processing such as down-conversion and filtering on a radio frequency signal to obtain an intermediate frequency signal.

Figure 5:
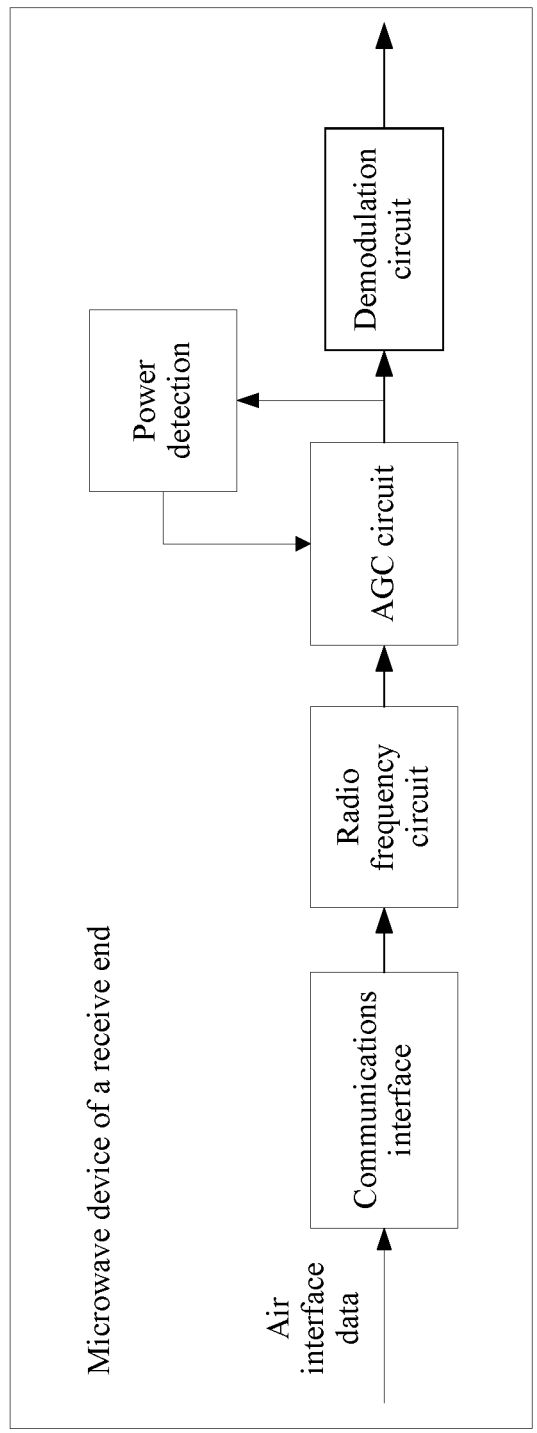
FIG. 5 is a schematic structural diagram of a microwave device of a receive end according to an embodiment of the present invention.

It can be understood that the microwave device in the embodiments of the present invention may be used as a receive end device. As shown in FIG. 5, a microwave device as a receive end includes a communications interface, a radio frequency circuit, an AGC circuit, a power detection module, and a demodulation circuit. The microwave device as a receive end may receive a microwave radio frequency signal (air interface data) using the communications interface. The radio frequency circuit is configured to generate a microwave air interface frame after performing processing such as down-conversion, digital-to-analog conversion, and filtering on the microwave radio frequency signal received by the communications interface. The AGC circuit is configured to adjust power of the microwave air interface frame received by the AGC circuit, so that power of the microwave air interface frame output by the AGC circuit remains stable. The power detection module is configured to detect whether the power of the microwave air interface frame output by the AGC circuit meets a condition. The demodulation circuit is configured to demodulate a CPRI frame whose power remains stable.

For ease of understanding by a person skilled in the art, a data sending and receiving method provided in the embodiments of the present invention may be applicable to the foregoing two possible implementations. This is not limited in the present invention.

Embodiment 1

Figure 6A:
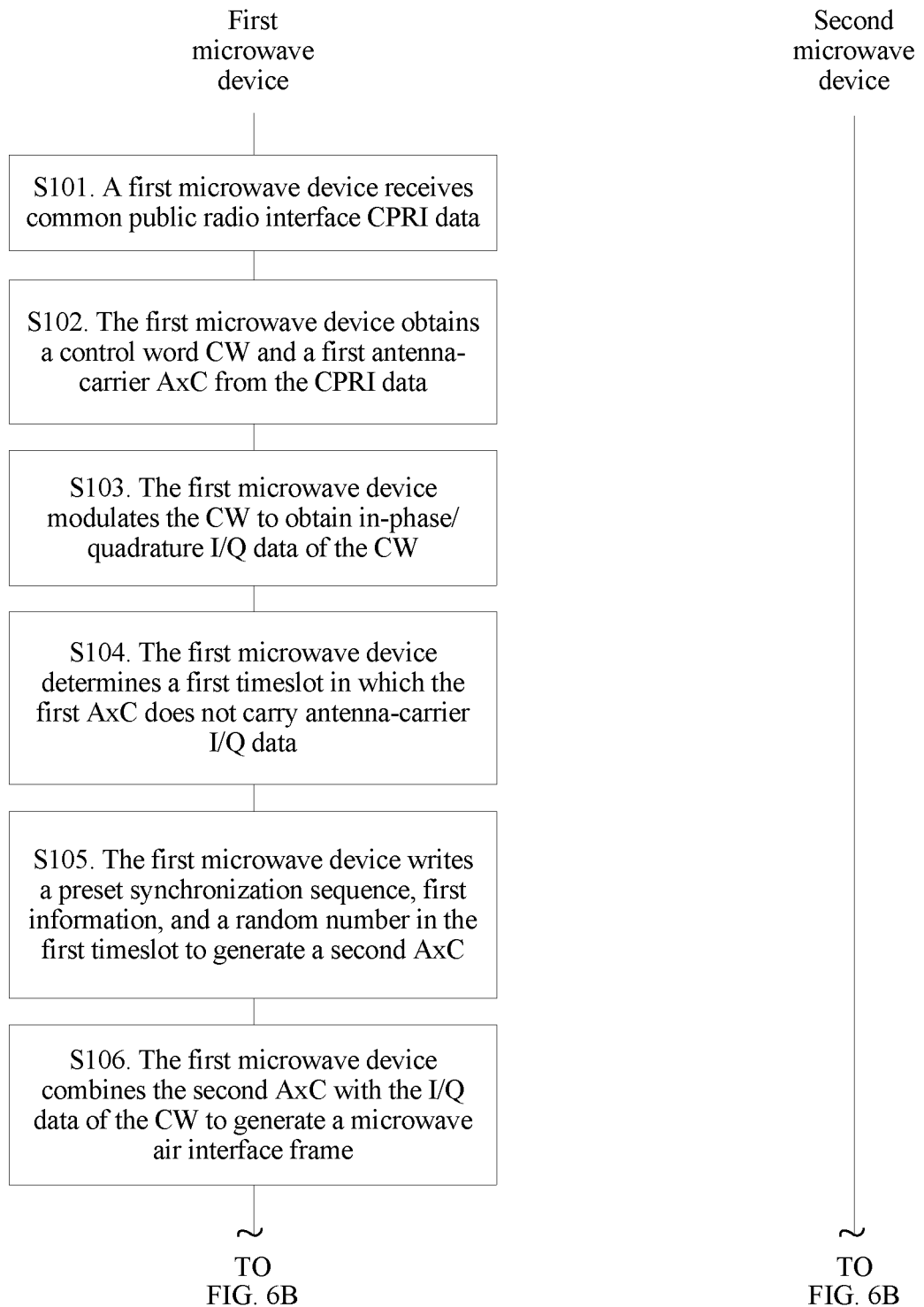

This embodiment of the present invention provides a data sending and receiving method. As shown in FIG. 6A and FIG. 6B, the method may include the following steps.

S101. A first microwave device receives a common public radio interface (CPRI) frame.

The first microwave device may receive the CPRI frame from a BBU that is connected to the first microwave device.

S102. The first microwave device obtains a control word CW and a first antenna-carrier A×C from the CPRI frame.

After receiving the CPRI frame, the first microwave device processes (for example, parses) the CPRI frame, so as to separate and obtain the control word CW and the first antenna-carrier A×C that are included in the CPRI frame. The control word CW is mainly used to implement functions such as control, management, timing, and synchronization. The first antenna-carrier A×C may carry one or more pieces of antenna-carrier I/Q data. The antenna-carrier I/Q data is digital sampling of a baseband I/Q signal of a radio carrier signal transmitted or received by an antenna.

S103. The first microwave device modulates the CW to obtain in-phase/quadrature I/Q data of the CW.

After obtaining the CW and the first antenna-carrier A×C that are included in the CPRI frame, to reduce microwave signal bandwidth required for transmitting the CPRI frame, the first microwave device needs to modulate the separated CW by using a preset modulation method, so as to generate the I/Q data of the CW. The I/Q data of the CW is data of the CW modulated by using the preset modulation method.

Preferably, the preset modulation method is quadrature amplitude modulation (QAM).

S104. The first microwave device determines a first timeslot in which the first A×C does not carry antenna-carrier I/Q data.

Radio signal information may carry one or more pieces of antenna-carrier I/Q data. Therefore, in a timeslot, the radio signal information may not carry antenna-carrier I/Q data. Specifically, when the radio signal information does not carry antenna-carrier I/Q data in a timeslot, power of the radio signal information in the timeslot is extremely low or even zero.

Similarly, if an A×C does not carry antenna-carrier I/Q data in a timeslot, power of the A×C in the timeslot is extremely low or even zero. When a second microwave device receives such a CPRI frame, an AGC gain of the second microwave device fluctuates greatly.

To reduce fluctuation in the AGC gain of the second microwave device, the first microwave device needs to determine the first timeslot in which the first A×C sent by the first microwave device does not carry antenna-carrier I/Q data, so that the first microwave device performs corresponding processing on data in the first timeslot.

It should be noted that, in actual application, there is at least one first timeslot. The first microwave device uses a same method to determine all first timeslots. The first microwave device determines all the first timeslots basically in real time due to a delay requirement of a data transmission system. Therefore, an example in which the first microwave device determines one of the first timeslots is used for description in this embodiment of the present invention.

A method for determining a first timeslot by the first microwave device may include the following implementations, and is not specifically limited in this embodiment of the present invention.

Optionally, the CW of the CPRI frame includes a preset timeslot identifier. The timeslot identifier includes a first timeslot identifier or a second timeslot identifier, or both. The first timeslot identifier indicates the first timeslot in which the first A×C does not carry antenna-carrier I/Q data. The second timeslot identifier indicates a second timeslot in which the first A×C carries antenna-carrier I/Q data. In this case, the method for determining a first timeslot by the first microwave device is as follows. The first microwave device extracts the timeslot identifier from the CW, and the first microwave device determines the first timeslot according to the timeslot identifier.

Optionally, the method for determining a first timeslot by the first microwave device is as follows. The first microwave device stores data with a preset length in the first A×C. The first microwave device computes an energy histogram of data stored in the first microwave device, and determines a starting location of the first timeslot according to a curve feature in the energy histogram. The first microwave device determines the first timeslot according to a preset uplink-downlink subframe configuration and the starting location of the first timeslot.

Figure 7:
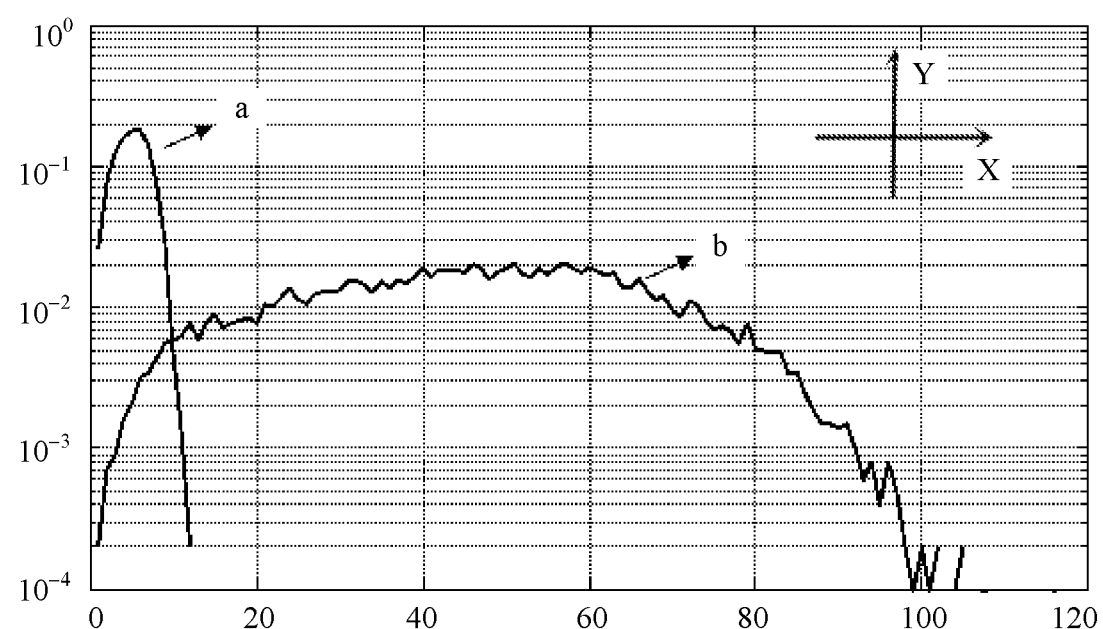
FIG. 7 is a schematic diagram of a histogram computed by a first microwave device according to an embodiment of the present invention.

For example, as shown in FIG. 7, when the first antenna-carrier (A×C) in the CPRI frame carries antenna-carrier I/Q data, a curve of a histogram of the first antenna-carrier A×C computed by the first microwave device is generally shown as a curve b. When the first antenna-carrier A×C does not carry antenna-carrier I/Q data, a curve of a histogram of the first antenna-carrier A×C computed by the first microwave device is shown as a curve a. In FIG. 7, an x-axis represents an energy value, and a y-axis represents a probability. It can be seen that, when the first antenna-carrier A×C carries antenna-carrier I/Q data, energy of the first antenna-carrier A×C is relatively concentrated, an energy value is relatively large, and a peak value of the curve b is located in a central area of the x-axis. When the first antenna-carrier A×C does not carry antenna-carrier I/Q data, an energy value of the first antenna-carrier A×C is extremely small, and a peak value of the curve a is located in a left area of the x-axis.

It can be understood that, in this application scenario, the first microwave device determines the first timeslot by computing a histogram. However, computation for a histogram belongs to a category of statistics, and a histogram cannot be computed according to a single piece of data. Therefore, in this application scenario, the first microwave device needs to store data with a preset length in the first A×C, and then performs histogram computation on the data with a preset length.

It should be noted that the first microwave device in this embodiment of the present invention may cache the data with a preset length in the first A×C. To reduce a delay caused by storing data, a length of data stored in the first microwave device should not be extremely long. The preset length of data stored in the first microwave device needs to be specifically determined according to an actual application situation, and is not specifically limited in this embodiment of the present invention.

Specifically, the first microwave device may determine, according to the curve feature in the energy histogram, whether data stored in the first microwave device carries antenna-carrier I/Q data. If the data stored in the first microwave device does not carry antenna-carrier I/Q data, the first microwave device may use a moment corresponding to the last piece of data in the data stored in the first microwave device as the starting location of the first timeslot.

It should be noted that a length of data stored in the first microwave device is a preset length, and the preset length is relatively short, usually at a nano level. Therefore, in this application scenario, the first microwave device may use a moment corresponding to the last piece of data in the data stored in the first microwave device as the starting location of the first timeslot, or may use a moment corresponding to intermediate data in the data stored in the first microwave device as the starting location of the first timeslot. This is not specifically limited in this embodiment of the present invention.

Further, according to the determined starting location of the first timeslot and the preset uplink-downlink subframe configuration, the first microwave device determines the first timeslot in which the A×C does not carry antenna-carrier I/Q data.

For example, if the preset uplink-downlink subframe configuration is m:n, where m≥1, and n≥1, the first microwave device may use a formula (1) or a formula (2) to determine the first timeslot.

$$\text{Starting location of the first timeslot} + \frac{m}{(m+n)} \times \text{Frame length} \quad (1)$$

$$\text{Starting location of the first timeslot} + \frac{n}{(m+n)} \times \text{Frame length} \quad (2)$$

It should be noted that the first microwave device in this embodiment of the present invention may also analyze data stored in the first microwave device using another statistical method such as an amplitude histogram or a line graph, and determine the starting location of the first timeslot according to an analysis result. This is not specifically limited in this embodiment of the present invention.

Optionally, the method for determining a first timeslot by the first microwave device is as follows. The first microwave device computes power or a frequency spectrum of the first A×C; the first microwave device determines a moment at which the power or the frequency spectrum of the first A×C is less than a second preset threshold as a starting location of the first timeslot; and the first microwave device determines the first timeslot according to a preset uplink-downlink subframe configuration and the starting location of the first timeslot.

Specifically, when a peak value of the frequency spectrum of the first A×C is less than the second preset threshold, it indicates that the first microwave device receives a signal with extremely low energy. In this case, the first antenna-carrier (A×C) does not carry antenna-carrier I/Q data. The first microwave device computes the frequency spectrum of the first A×C, and determines a moment at which the peak value of the frequency spectrum of the first A×C is less than the second preset threshold as the starting location of the first timeslot.

Specifically, to prevent a false negative, the first microwave device first determines whether a value of the power is less than a third preset threshold. The third preset threshold is greater than the second preset threshold. If the value of the power is less than the third preset threshold, the first microwave device records a moment at which the value of the power is less than the third preset threshold as a first moment.

Further, in actual application, there may be data with extremely low power in antenna-carrier I/Q data carried by the first A×C. A difference between power of these data and power of the first A×C that does not carry antenna-carrier I/Q data is extremely small. Therefore, to prevent a false positive, the first microwave device further needs to compute power of n (n≥1) consecutive pieces of data starting from the first moment in the first A×C, and determine whether power values of the n consecutive pieces of data are less than the second preset threshold; and if the power values of the n consecutive pieces of data are less than the second preset threshold, the first microwave device determines a moment in a time period starting from the first piece of data to the last piece of data in the n consecutive pieces of data as the starting location of the first timeslot.

It should be noted that, in actual application, a length of the time period starting from the first piece of data to the last piece of data in the n consecutive pieces of data is extremely short, usually at a nano level. Therefore, in this application scenario, the starting location of the first timeslot determined by the first microwave device may be any moment in a first time period.

In addition, a quantitative value n of the n consecutive pieces of data starting from the first moment needs to be specifically determined according to an actual application situation, and is not specifically limited in this embodiment of the present invention.

Further, according to the determined starting location of the first timeslot and the preset uplink-downlink subframe configuration, the first microwave device determines the first timeslot in which the A×C does not carry antenna-carrier I/Q data. The first microwave device may use the formula (1) or the formula (2) to determine the first timeslot. Details are not described herein.

S105. The first microwave device writes a preset synchronization sequence, first information, and a random number in the first timeslot to generate a second A×C.

To reduce the fluctuation in the AGC gain of the second microwave device, the first microwave device writes the synchronization sequence, the first information, and the random number in the first timeslot in which the first A×C does not carry antenna-carrier I/Q data, so as to generate the second A×C.

The first information includes at least one of a preset channel estimate or a preset radio frequency weighted matrix of the first microwave device. The preset channel estimate is used to assist the first microwave device in precoding. The preset synchronization sequence is used to ensure that the second microwave device can identify the first information.

Generally, time occupied by the first information and the preset synchronization sequence is less than the first timeslot. Therefore, the first microwave device further needs to write some random numbers in the first timeslot, in addition to writing the first information and the preset synchronization sequence.

Preferably, the random number written in the first timeslot by the first microwave device is a random number with energy normalization.

For example, the time occupied by the first information and the preset synchronization sequence is t1 in total, time occupied by the random number with energy normalization is t2, and the first timeslot is T. In this case, T=t1+t2.

S106. The first microwave device combines the second A×C with the I/Q data of the CW to generate a microwave air interface frame.

Optionally, the first microwave device evenly interleaves the second A×C with the I/Q data of the CW in a payload area of the microwave air interface frame.

S107. The first microwave device sends the microwave air interface frame to a second microwave device.

After combining the second A×C with the I/Q data of the CW to generate the microwave air interface frame, the first microwave device sends the microwave air interface frame in a time division multiplexing manner. In this way, the microwave air interface frame may be transmitted on one microwave channel, so as to enable an entire microwave system to be a single carrier system, thereby reducing hardware complexity, and reducing costs.

Specifically, the first microwave device may perform processing such as shaping filtering, digital-to-analog conversion, and up-conversion on the microwave air interface frame to generate a microwave radio frequency signal, and then send the microwave radio frequency signal by using a microwave air interface.

S108. The second microwave device receives the microwave air interface frame from a microwave air interface, and obtains the second antenna-carrier A×C and the I/Q data of the control word CW from the microwave air interface frame, where the second A×C includes at least the first information and the preset synchronization sequence.

Specifically, a method for receiving the microwave air interface frame from the microwave air interface by the second microwave device may be as follows. The second microwave device receives the microwave radio frequency signal from the microwave air interface, and after receiving the microwave radio frequency signal, performs processing such as down-conversion, digital-to-analog conversion, and filtering on the microwave radio frequency signal to generate the microwave air interface frame.

Further, after receiving the microwave air interface frame, the second microwave device may parse the microwave air interface frame to extract the second antenna-carrier A×C and the I/Q data of the control word CW that are included in the microwave air interface frame.

The second antenna-carrier A×C includes at least the first information and the preset synchronization sequence. The preset synchronization sequence is used to identify the first information. The first information includes at least one of the preset channel estimate or the preset radio frequency weighted matrix of the first microwave device.

S109. The second microwave device demodulates the I/Q data of the CW to generate the CW.

S110. The second microwave device performs autocorrelation computation on the second A×C by using the preset synchronization sequence, and extracts the first information to obtain the first A×C.

S111. The second microwave device recombines the CW and the first A×C to generate a CPRI frame, and sends the CPRI frame.

Specifically, after obtaining the first A×C and the CW, the second microwave device recombines the first A×C and the CW to generate the CPRI frame, and sends the generated CPRI frame to an RRU that is connected to the second microwave device.

It can be learned from the foregoing description that the method for determining a first timeslot by the first microwave device may be as follows. The first microwave device determines the first timeslot according to the preset timeslot identifier included in the CW; or the first microwave device determines the first timeslot after performing related computation on the first A×C.

Figure 8A:
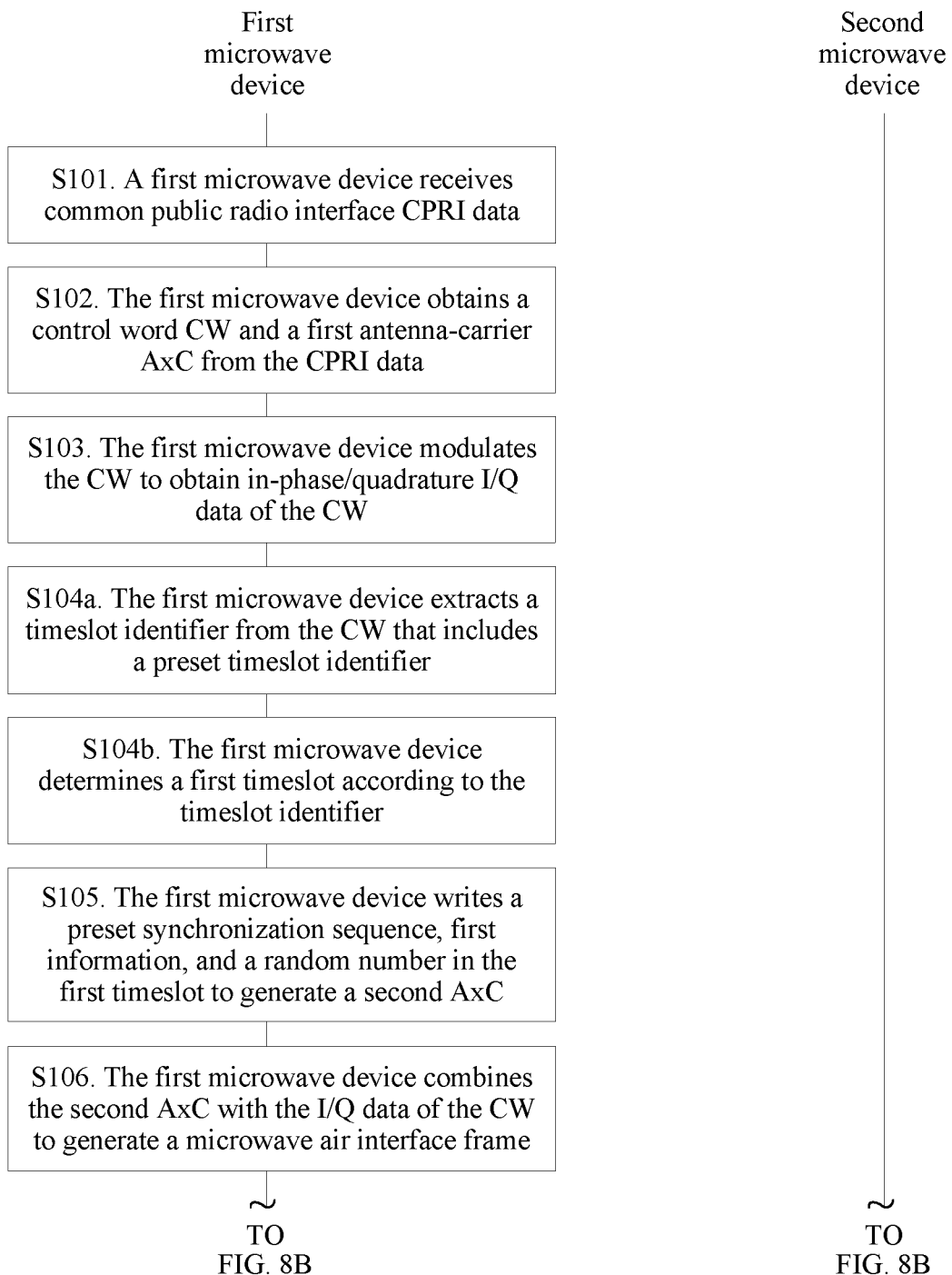
FIG. 8A and FIG. 8B are a schematic flowchart 2 of a data sending and receiving method according to an embodiment of the present invention.
Figure 8B:
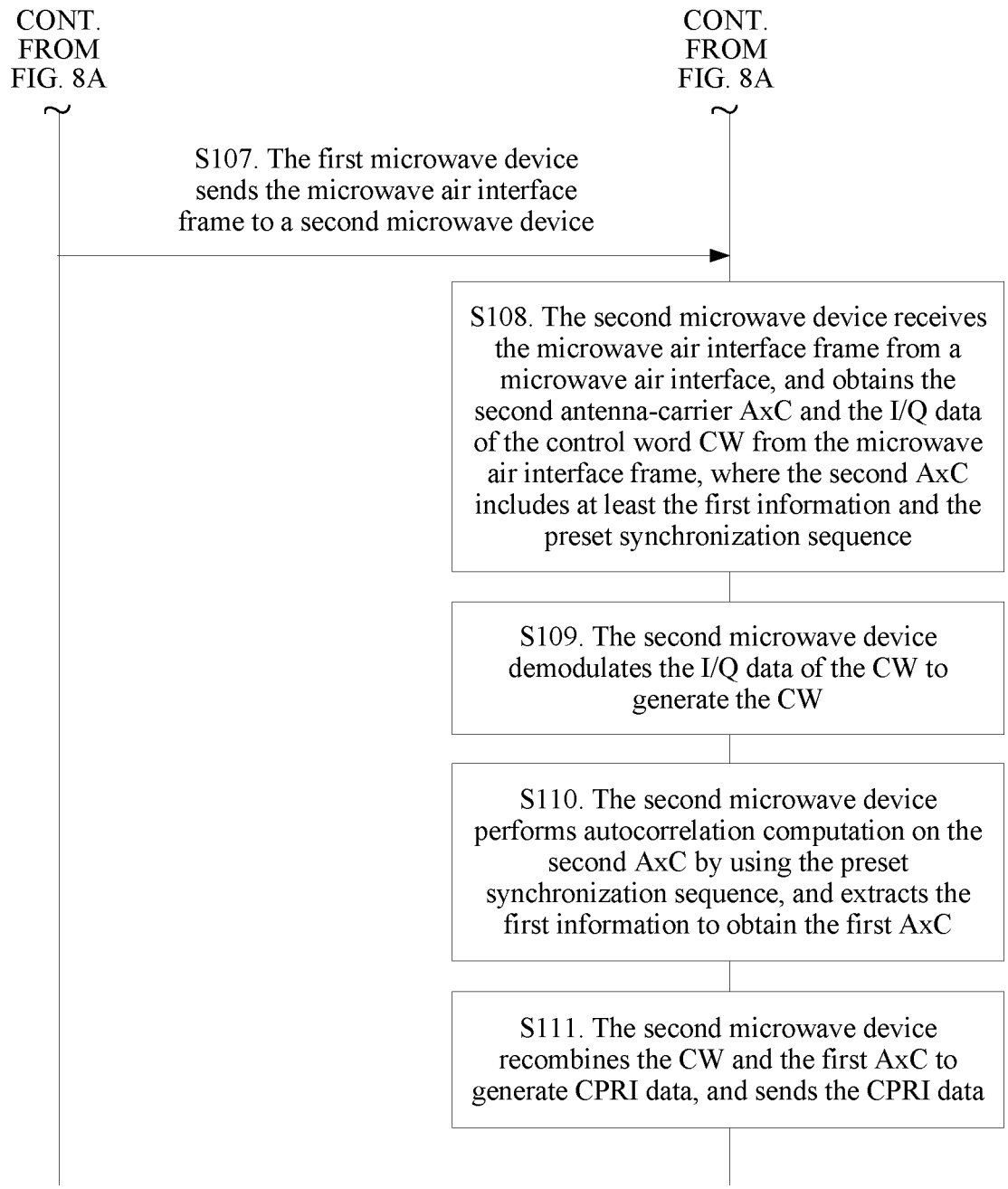

Specifically, as shown in FIG. 8A and FIG. 8B, S104 may be replaced by S104$a$ and S104$b$.

S104$a$. The first microwave device extracts a timeslot identifier from the CW that includes a preset timeslot identifier.

S104$b$. The first microwave device determines a first timeslot according to the timeslot identifier.

Figure 9A:
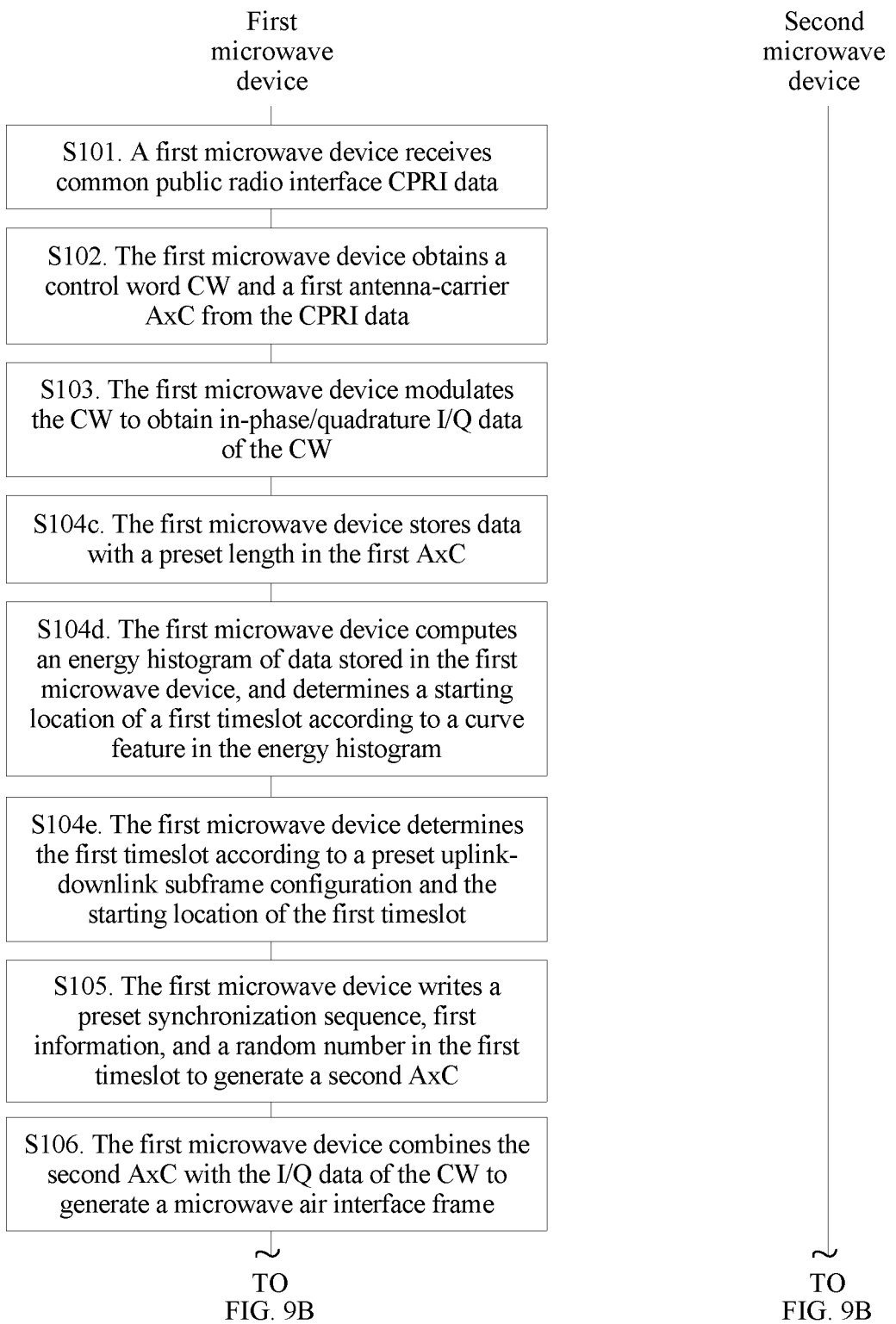
FIG. 9A and FIG. 9B are a schematic flowchart 3 of a data sending and receiving method according to an embodiment of the present invention.
Figure 9B:
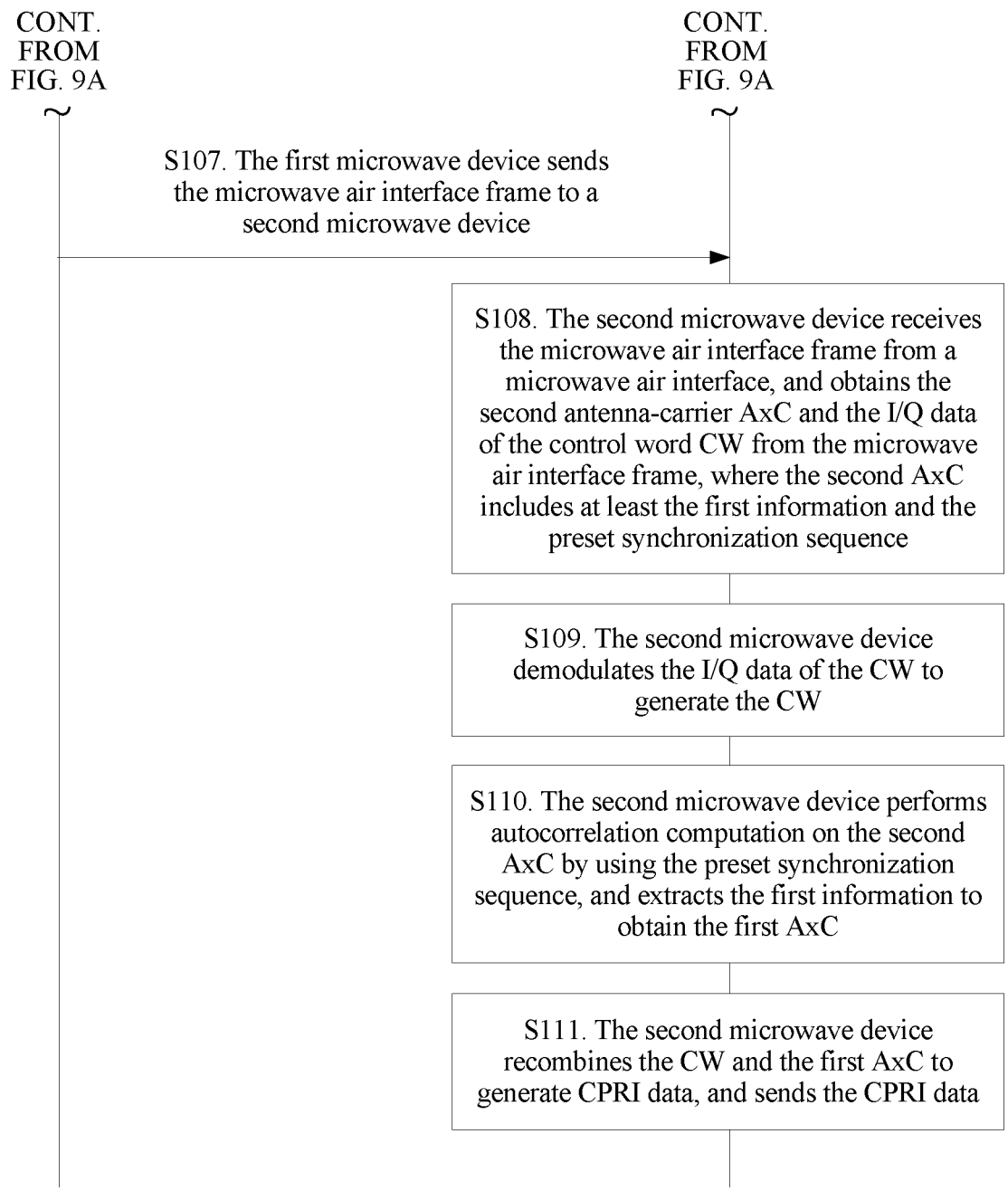

Specifically, as shown in FIG. 9A and FIG. 9B, S104 may be replaced by S104$c$, S104$d$, and S104$e$.

S104$c$. The first microwave device stores data with a preset length in the first A×C.

S104$d$. The first microwave device computes an energy histogram of data stored in the first microwave device, and determines a starting location of a first timeslot according to a curve feature in the energy histogram.

S104$e$. The first microwave device determines the first timeslot according to a preset uplink-downlink subframe configuration and the starting location of the first timeslot.

Figure 10A:
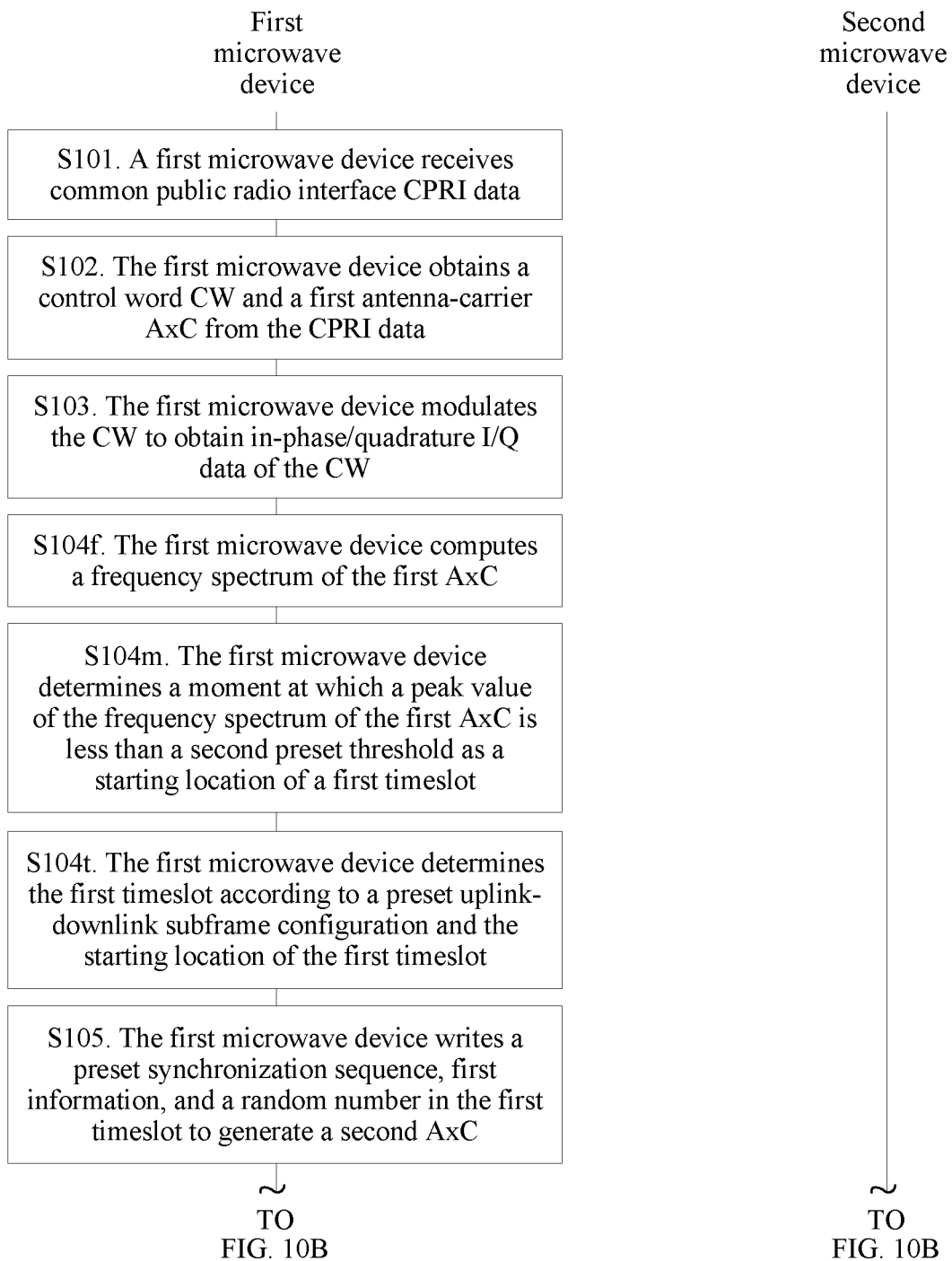
FIG. 10A and FIG. 10B are a schematic flowchart 4 of a data sending and receiving method according to an embodiment of the present invention.
Figure 10B:
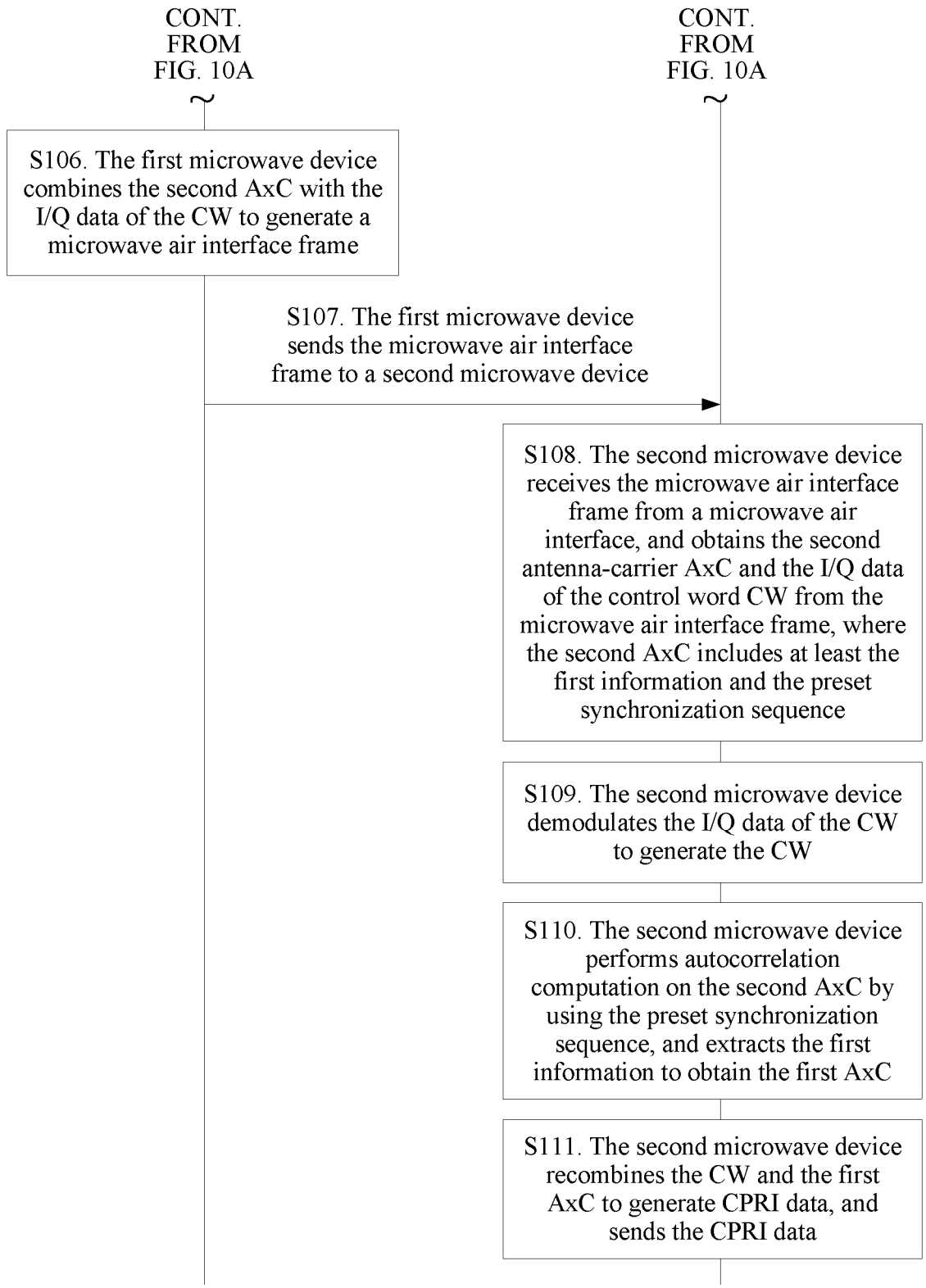

Specifically, as shown in FIG. 10A and FIG. 10B, S104 may be replaced by S104$f$, S104$m$, and S104$t$.

S104$f$. The first microwave device computes a frequency spectrum of the first A×C.

S104$m$. The first microwave device determines a moment at which a peak value of the frequency spectrum of the first A×C is less than a second preset threshold as a starting location of a first timeslot.

S104$t$. The first microwave device determines the first timeslot according to a preset uplink-downlink subframe configuration and the starting location of the first timeslot.

Figure 11A:
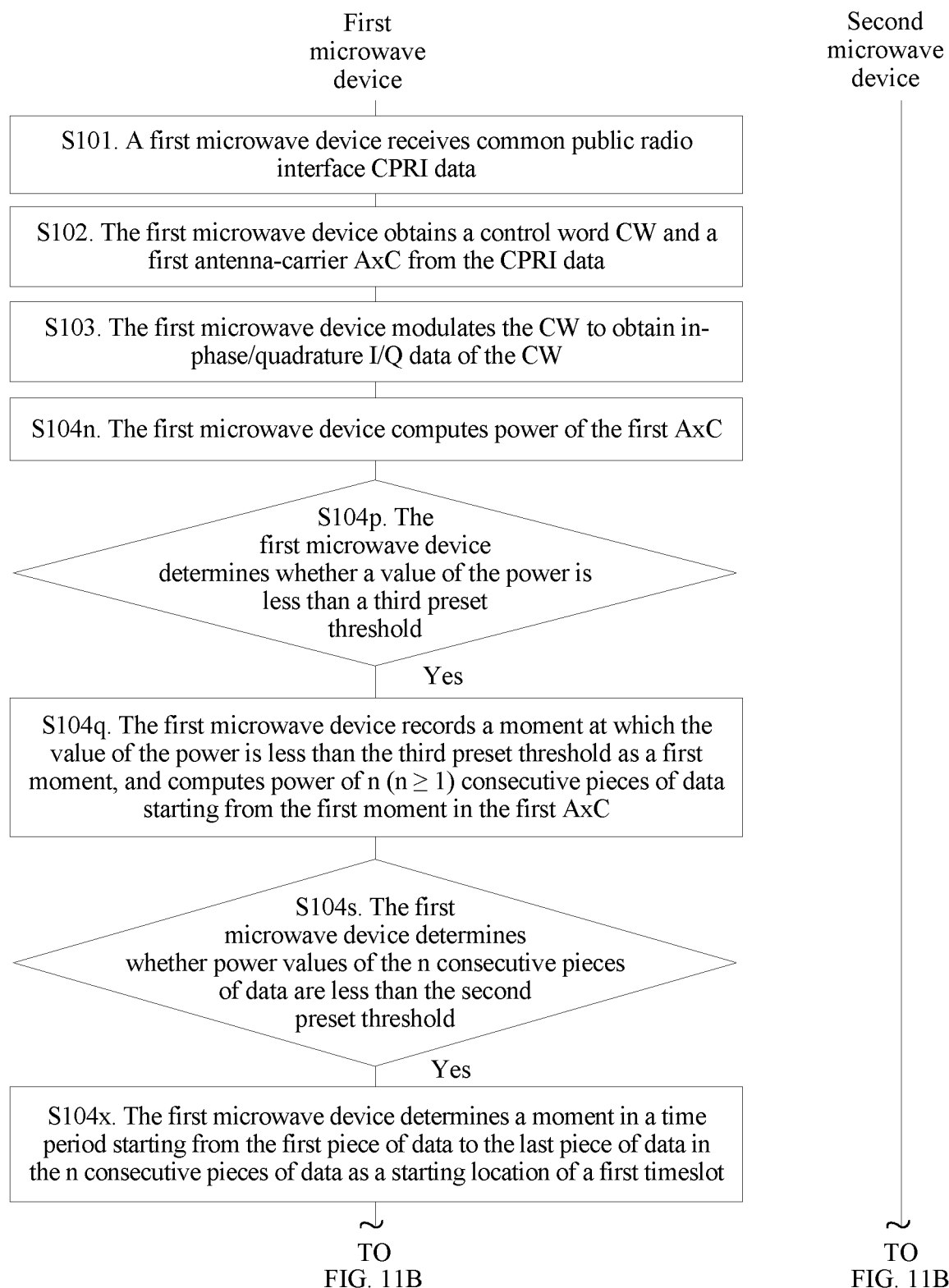

Specifically, as shown in FIG. 11A and FIG. 11B, S104 may be replaced by S104$n$, S104$p$, S104$q$, S104$s$, S104$x$, and S104$y$.

S104$n$. The first microwave device computes power of the first A×C.

S104$p$. The first microwave device determines whether a value of the power is less than a third preset threshold, where the third preset threshold is greater than a second preset threshold.

S104$q$. If the value of the power is less than the third preset threshold, the first microwave device records a moment at which the value of the power is less than the third preset threshold as a first moment, and computes power of n (n≥1) consecutive pieces of data starting from the first moment in the first A×C.

S104$s$. The first microwave device determines whether power values of the n consecutive pieces of data are less than the second preset threshold.

S104$x$. If the power values of the n consecutive pieces of data are less than the second preset threshold, the first microwave device determines a moment in a time period starting from the first piece of data to the last piece of data in the n consecutive pieces of data as a starting location of a first timeslot.

S104$y$. The first microwave device determines the first timeslot according to a preset uplink-downlink subframe configuration and the starting location of the first timeslot.

Figure 12:
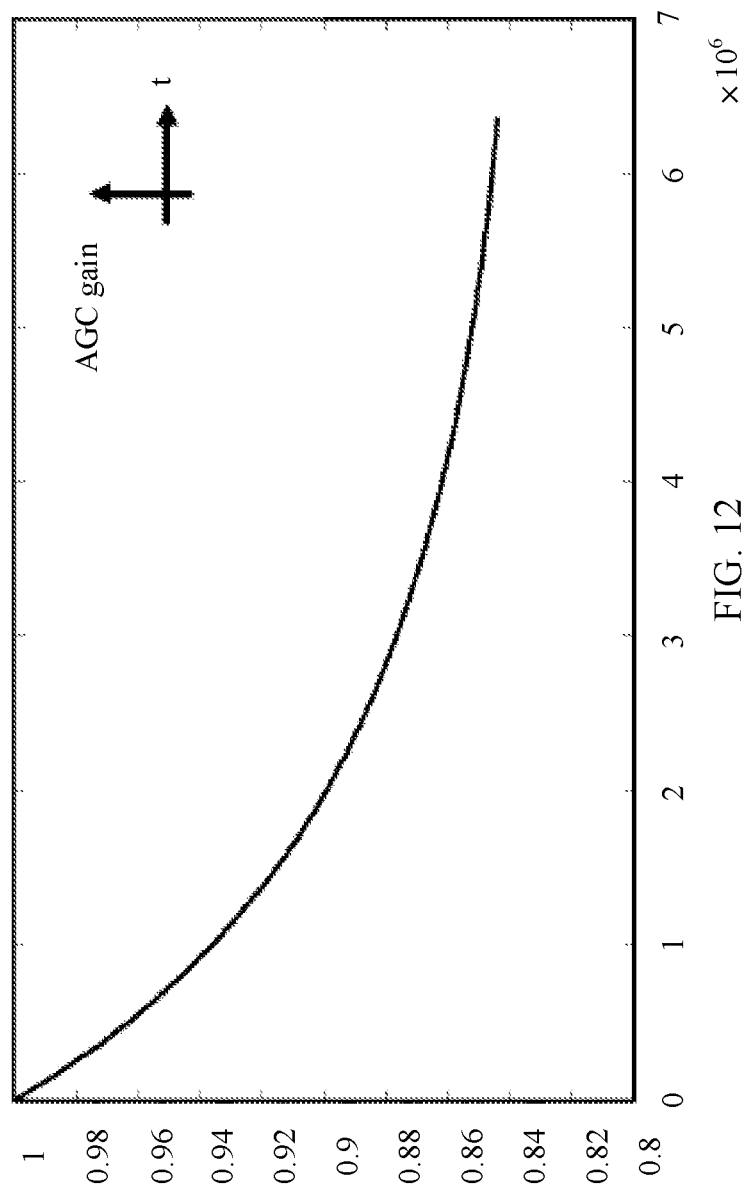
FIG. 12 is a schematic diagram of an AGC curve of a second microwave device according to an embodiment of the present invention.
Figure 13:
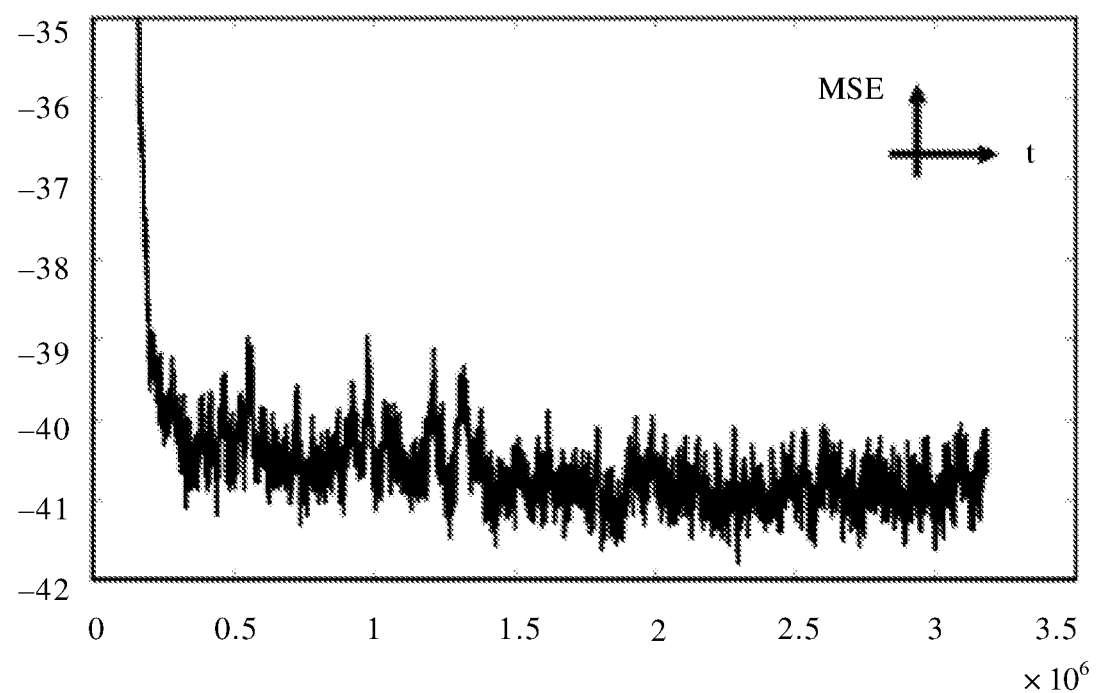
FIG. 13 is a schematic diagram of an MSE curve of a microwave link according to an embodiment of the present invention.

According to the method described above, the first microwave device writes the preset synchronization sequence, the first information, and the random number in the first timeslot in which the first A×C does not carry antenna-carrier I/Q data, so as to improve the power of the first A×C after the data is written. In this way, when the first microwave device sends the second A×C generated after the data is written and the I/Q data of the CW to the second microwave device, the AGC gain of the second microwave device may not increase or decrease sharply, that is, the fluctuation in the AGC gain of the second microwave device is reduced, thereby reducing fluctuation in an MSE curve of a microwave link, and improving system performance. For example, FIG. 12 shows an AGC gain curve of a second microwave device according to the data sending and receiving method provided in this embodiment of the present invention. In FIG. 12, a horizontal coordinate represents time t, and a vertical coordinate represents an AGC gain. FIG. 13 shows an MSE curve of a microwave link according to the data sending and receiving method provided in this embodiment of the present invention. In FIG. 13, a horizontal coordinate represents time t, and a vertical coordinate represents an MSE.

It can be learned from FIG. 12 that, according to the data sending and receiving method provided in this embodiment of the present invention, the AGC gain curve of the second microwave device is smoother, compared with the AGC gain curve in FIG. 1. Jitter of the MSE in FIG. 13 is about 1 dB. Compared with jitter of the MSE in FIG. 2, a jitter range of the MSE is reduced by about 2 dB.

According to the data sending and receiving method provided in this embodiment of the present invention, after obtaining the first AxC and the CW, the first microwave device determines the first timeslot in which the first AxC does not carry antenna-carrier I/Q data, and writes the preset synchronization sequence, the first information, and the random number in the first timeslot to generate the second AxC, so that power of the second AxC is improved as a whole. In addition, the first microwave device modulates the CW to obtain the in-phase/quadrature I/Q data of the CW. Then, the first microwave device combines the second AxC with the I/Q data of the CW to generate the microwave air interface frame, and sends the microwave air interface frame in the time division multiplexing manner, so that the second AxC and the I/Q data of the CW can be transmitted through one microwave channel. Because the power of the second AxC is improved as a whole, after the second microwave device that is opposite to the first microwave device receives the microwave air interface frame, the AGC gain of the second microwave device may not increase or decrease sharply, that is, the fluctuation in the AGC gain of the second microwave device is reduced, thereby reducing the fluctuation in the MSE curve of the microwave link, and improving the system performance.

Embodiment 2

Figure 14:
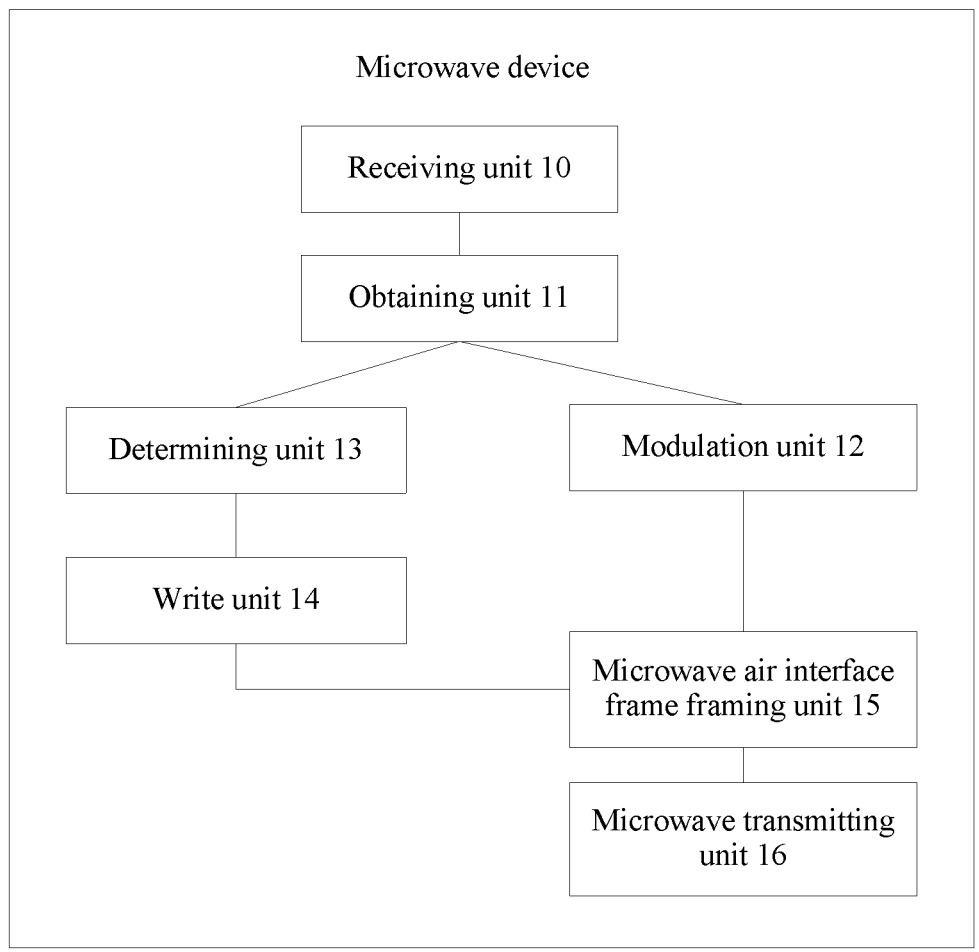
FIG. 14 is a schematic structural diagram 1 of a microwave device according to an embodiment of the present invention.

As shown in FIG. 14, this embodiment of the present invention provides a microwave device. The microwave device is configured to perform the steps performed by a first microwave device in the foregoing method. The microwave device may include modules corresponding to the corresponding steps. The microwave device is a first microwave device. For example, the microwave device may include: a receiving unit 10, configured to receive a common public radio interface (CPRI) frame. The microwave device may also include an obtaining unit 11, configured to obtain a control word (CW) and a first antenna-carrier (AxC) from the CPRI frame received by the receiving unit 10. The microwave device may also include a modulation unit 12, configured to modulate the CW obtained by the obtaining unit 11 to obtain in-phase/quadrature I/Q data of the CW. The microwave device may also include a determining unit 13, configured to determine a first timeslot, where the first timeslot is a timeslot in which the first AxC obtained by the obtaining unit 11 does not carry antenna-carrier I/Q data. The microwave device may also include a write unit 14, configured to write a preset synchronization sequence, first information, and a random number in the first timeslot determined by the determining unit 13 to generate a second AxC, where the first information includes at least one of a preset channel estimate or a preset radio frequency weighted matrix of the first microwave device. The microwave device may also include a microwave air interface frame framing unit 15, configured to combine the second AxC generated by the write unit 14 with the I/Q data of the CW obtained by the modulation unit to generate a microwave air interface frame. The microwave device may also include a microwave transmitting unit 16, configured to send, in a time division multiplexing manner, the microwave air interface frame generated by the microwave air interface frame framing unit 15.

Optionally, the CW includes a preset timeslot identifier. The timeslot identifier includes a first timeslot identifier and/or a second timeslot identifier. The first timeslot identifier is used to indicate the first timeslot. The second timeslot identifier indicates a second timeslot. The second timeslot is a timeslot in which the first AxC carries antenna-carrier I/Q data.

Figure 15:
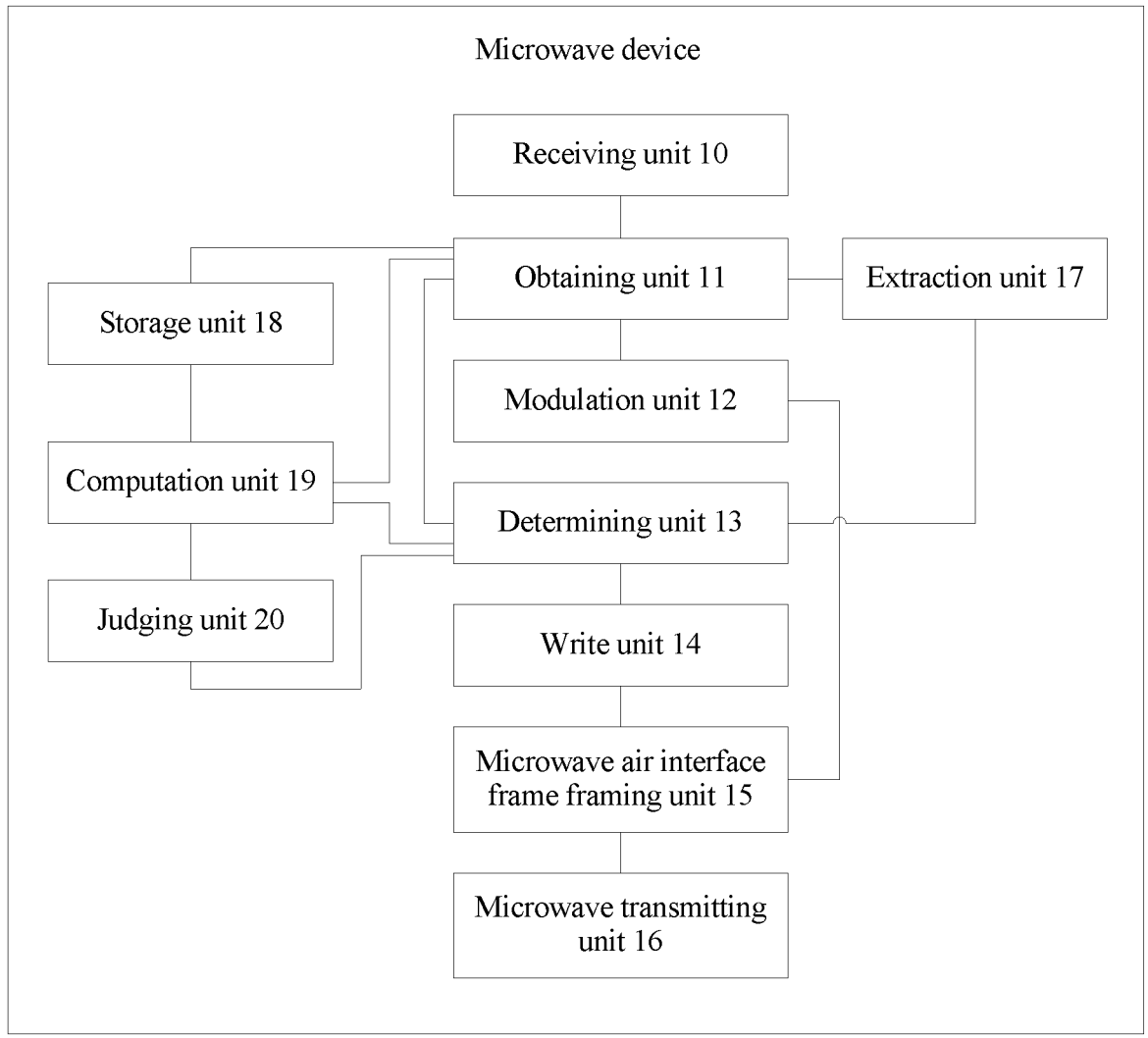
FIG. 15 is a schematic structural diagram 2 of a microwave device according to an embodiment of the present invention.

Further, as shown in FIG. 15, the first microwave device further includes an extraction unit 17.

The extraction unit 17 is configured to extract the timeslot identifier from the CW obtained by the obtaining unit 11.

Further, the determining unit 13 is configured to determine the first timeslot according to the timeslot identifier extracted by the extraction unit 17.

Optionally, as shown in FIG. 15, the first microwave device further includes a storage unit 18.

The storage unit 18 is configured to store data with a preset length in the first AxC.

Further, as shown in FIG. 15, the first microwave device further includes a computation unit 19.

The computation unit 19 is further configured to compute an energy histogram of the data stored in the storage unit 18.

Further, the determining unit 13 is configured to determine a starting location of the first timeslot according to a curve feature in the energy histogram computed by the computation unit 19, and determine the first timeslot according to a preset uplink-downlink subframe configuration and the starting location of the first timeslot.

Further, the computation unit 19 is further configured to compute an attribute of the first AxC obtained by the obtaining unit 11. The attribute includes power or a frequency spectrum of the first AxC.

Further, the determining unit 13 is specifically configured to determine a moment at which a value of the attribute computed by the computation unit 19 is less than a second preset threshold as the starting location of the first timeslot, and specifically configured to determine the first timeslot according to the preset uplink-downlink subframe configuration and the starting location of the first timeslot.

Further, the attribute is the power.

As shown in FIG. 15, the first microwave device further includes a judging unit 20.

The judging unit 20 is configured to determine whether a value of the power computed by the computation unit 19 is less than a third preset threshold, where the third preset threshold is greater than the second preset threshold.

Further, the computation unit 19 is further configured to: if the judging unit 20 determines that the value of the power is less than the third preset threshold, record a first moment, and compute power of n consecutive pieces of data starting from the first moment in the first AxC, where the first moment is a moment at which the value of the power is less than the third preset threshold, and n is a positive integer.

Further, the judging unit 20 is further configured to determine whether power values that are of the n consecutive pieces of data and that are computed by the computation unit 19 are less than the second preset threshold.

Further, the determining unit 13 is configured to: if the judging unit 20 determines that the power values of the n consecutive pieces of data are less than the second preset threshold, determine a moment in a first time period as the starting location of the first timeslot, where the first time period is a time period starting from the first piece of data to the last piece of data in the n consecutive pieces of data.

It can be understood that the microwave device in this embodiment may be corresponding to the first microwave device in the data sending and receiving method of the embodiment described in any one of FIG. 6A and FIG. 6B, FIG. 8A and FIG. 8B, FIG. 9A and FIG. 9B, FIG. 10A and FIG. 10B, or FIG. 11A and FIG. 11B, and division and/or functions of the modules in the microwave device in this embodiment are to implement the method process shown in any one of FIG. 6A and FIG. 6B, FIG. 8A and FIG. 8B, FIG.

9A and FIG. 9B, FIG. 10A and FIG. 10B, or FIG. 11A and FIG. 11B. For brevity, details are not described herein.

This embodiment of the present invention provides the microwave device. The microwave device is the first microwave device. After obtaining the first A×C and the CW, the first microwave device determines the first timeslot in which the first A×C does not carry antenna-carrier I/Q data, and writes the preset synchronization sequence, the first information, and the random number in the first timeslot to generate the second A×C, so that power of the second A×C is improved as a whole. In addition, the first microwave device modulates the CW to obtain the in-phase/quadrature I/Q data of the CW. Then, the first microwave device combines the second A×C with the I/Q data of the CW to generate the microwave air interface frame, and sends the microwave air interface frame in the time division multiplexing manner, so that the second A×C and the I/Q data of the CW can be transmitted through one microwave channel. Because the power of the second A×C is improved as a whole, after a second microwave device that is opposite to the first microwave device receives the microwave air interface frame, an AGC gain of the second microwave device may not increase or decrease sharply, that is, fluctuation in the AGC gain of the second microwave device is reduced, thereby reducing fluctuation in an MSE curve of a microwave link, and improving system performance.

Embodiment 3

Figure 16:
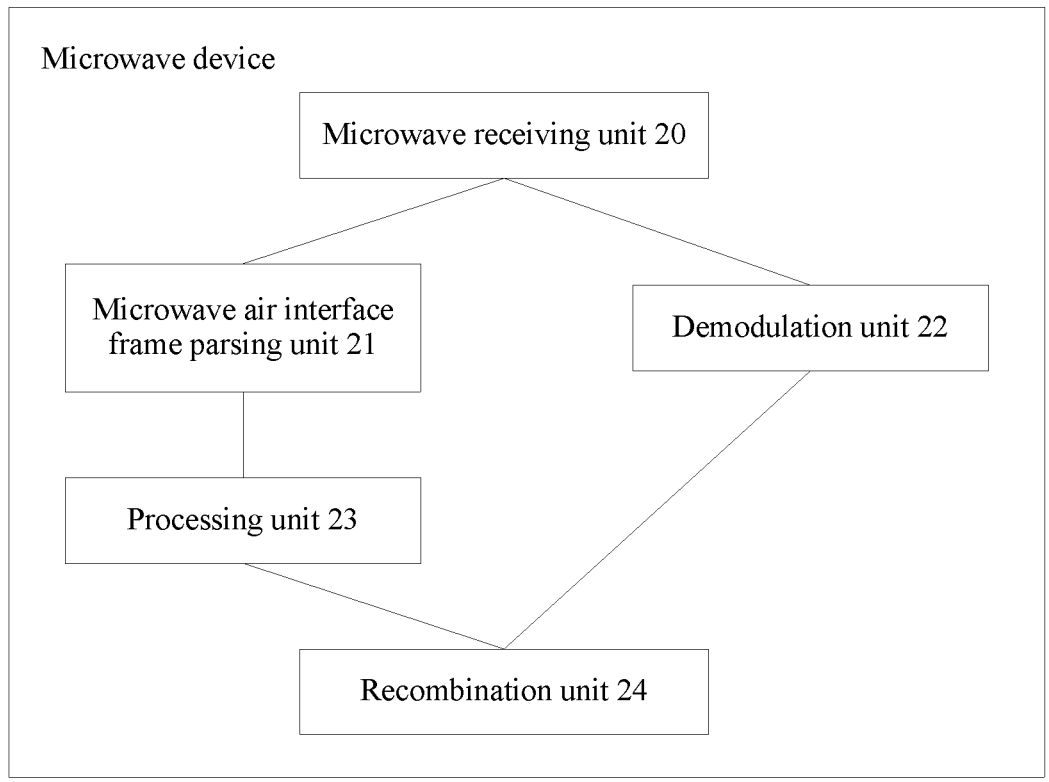
FIG. 16 is a schematic structural diagram 3 of a microwave device according to an embodiment of the present invention.

This embodiment of the present invention provides a microwave device. As shown in FIG. 16, the microwave device is configured to perform the steps performed by a second microwave device in the foregoing method. The microwave device may include modules corresponding to the corresponding steps. The microwave device is a second microwave device. For example, the microwave device may include: a microwave receiving unit 20, configured to receive a microwave air interface frame from a microwave air interface. The microwave device may also include a microwave air interface frame parsing unit 21, configured to obtain a second antenna-carrier (A×C) and in-phase/quadrature (I/Q) data of a control word (CW) from the microwave air interface frame received by the microwave receiving unit 20, where the second A×C includes at least first information and a preset synchronization sequence, the first information includes at least one of a preset channel estimate or a preset radio frequency weighted matrix of a first microwave device. The microwave device may also include a demodulation unit 22, configured to demodulate the I/Q data of the CW obtained by the microwave air interface frame parsing unit 21 to generate the CW. The microwave device may also include a processing unit 23, configured to perform autocorrelation computation on the second A×C by using the preset synchronization sequence obtained by the microwave air interface frame parsing unit 21 by parsing, and extract the first information to generate a first A×C. The microwave device may also include a recombination unit 24, configured to recombine the CW generated by the demodulation unit 22 and the first A×C generated by the processing unit 23 to generate a common public radio interface CPRI frame, and send the CPRI frame.

It can be understood that the microwave device in this embodiment may be corresponding to the second microwave device in the data sending and receiving method of the embodiment described in any one of FIG. 6A and FIG. 6B, FIG. 8A and FIG. 8B, FIG. 9A and FIG. 9B, FIG. 10A and FIG. 10B, or FIG. 11A and FIG. 11B, and division and/or functions of the modules in the microwave device in this embodiment are to implement the method process shown in any one of FIG. 6A and FIG. 6B, FIG. 8A and FIG. 8B, FIG. 9A and FIG. 9B, FIG. 10A and FIG. 10B, or FIG. 11A and FIG. 11B. For brevity, details are not described herein.

This embodiment of the present invention provides the microwave device. The microwave device is the second microwave device. The second A×C is generated after the first microwave device writes the preset synchronization sequence, the first information, and a random number in a first timeslot in which the first A×C does not carry I/Q data, and power of these written data is relatively high. Therefore, power of the second A×C in the microwave air interface frame sent by the first microwave device is also improved. When the second microwave device obtains the second A×C and the I/Q data of the CW from the microwave air interface frame, an AGC gain of the second microwave device may not increase or decrease sharply, so that fluctuation in the AGC gain of the second microwave device is reduced, thereby reducing fluctuation in an MSE curve of a microwave link, and improving system performance.

Embodiment 4

Figure 17:
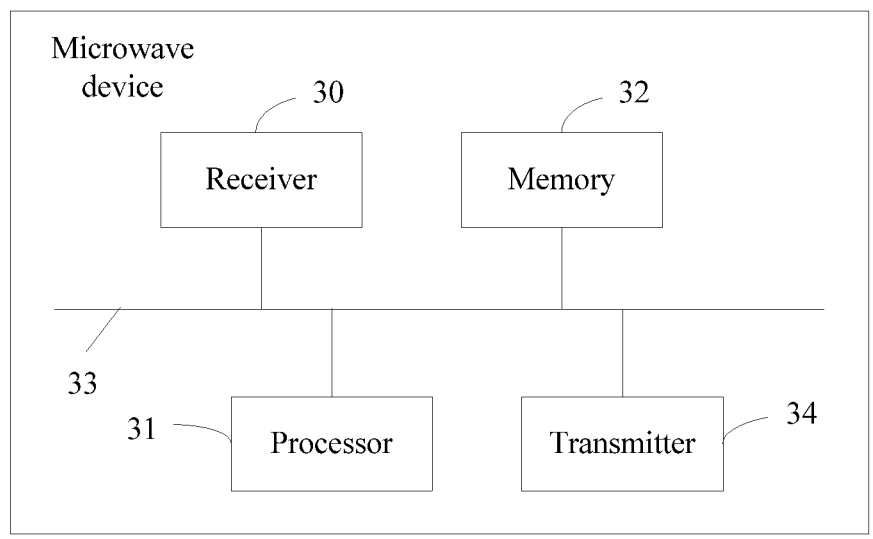
FIG. 17 is a schematic structural diagram 4 of a microwave device according to an embodiment of the present invention.

This embodiment of the present invention provides a microwave device. As shown in FIG. 17, the microwave device includes a receiver 30, a processor 31, a memory 32, a system bus 33, and a transmitter 34.

The receiver 30, the processor 31, the memory 32, and the transmitter 34 are connected and complete mutual communication by using the system bus 33.

Specifically, the microwave device in this embodiment of the present invention may be a sending device, or may be a receiving device.

The memory 32 is configured to store a computer execution instruction. The processor 31 is connected to the memory 32 using the system bus 33. When the microwave device runs, the processor 31 executes the computer execution instruction stored in the memory 32, so that the microwave device performs the data sending and receiving method of the embodiment described in any one of FIG. 6A and FIG. 6B, FIG. 8A and FIG. 8B, FIG. 9A and FIG. 9B, FIG. 10A and FIG. 10B, or FIG. 11A and FIG. 11B. For the specific data sending and receiving method, refer to related description of the embodiment shown in any one of FIG. 6A and FIG. 6B, FIG. 8A and FIG. 8B, FIG. 9A and FIG. 9B, FIG. 10A and FIG. 10B, or FIG. 11A and FIG. 11B. Details are not described herein.

Specifically, the processor 31 may be a central processing unit (CPU). Alternatively, the processor 31 may be another general purpose processor, a digital signal processor (DSP), another programmable logic device, a transistor logic device, a discrete hardware component, or the like. The general purpose processor may be a microprocessor, or the processor may be any normal processor, or the like.

The processor 31 may be a dedicated processor, and the dedicated processor may include at least one of a baseband processing chip, a radio frequency processing chip, or the like. Further, the dedicated processor may further include a chip having another processing function dedicated to a microwave device.

Specifically, the memory 32 may include a volatile memory such as a random access memory (RAM). Alternatively, the memory 32 may include a nonvolatile memory such as a read-only memory (ROM), a flash memory, an hard disk drive (HDD), or an solid-state drive (SSD).

Alternatively, the memory 32 may include a combination of the foregoing types of memories.

The system bus 33 may include a data bus, a power bus, a control bus, a status signal bus, or the like. In this embodiment, to clarify description, various buses in FIG. 17 are marked as the system bus 33.

The receiver 30 and the transmitter 34 may be collectively referred to as a communications interface. In addition, in a specific implementation of the microwave device, the receiver 30 and the transmitter 34 may be specifically a transceiver on the microwave device. The transceiver may be a wireless transceiver. For example, the wireless transceiver may be an antenna or the like of the microwave device.

This embodiment of the present invention provides the microwave device. The microwave device may be a first microwave device, or may be a second microwave device. After obtaining a first A×C and a CW, the first microwave device determines a first timeslot in which the first A×C does not carry antenna-carrier I/Q data, and writes a preset synchronization sequence, first information, and a random number in the first timeslot to generate a second A×C, so that power of the second A×C is improved as a whole. In addition, the first microwave device modulates the CW to obtain in-phase/quadrature (I/Q) data of the CW. Then, the first microwave device combines the second A×C with the I/Q data of the CW to generate a microwave air interface frame, and sends the microwave air interface frame in a time division multiplexing manner, so that the second A×C and the I/Q data of the CW can be transmitted through one microwave channel. Because the power of the second A×C is improved as a whole, after the second microwave device that is opposite to the first microwave device receives the microwave air interface frame, an AGC gain of the second microwave device may not increase or decrease sharply, that is, fluctuation in the AGC gain of the second microwave device is reduced, thereby reducing fluctuation in an MSE curve of a microwave link, and improving system performance.

Embodiment 5

Figure 18:
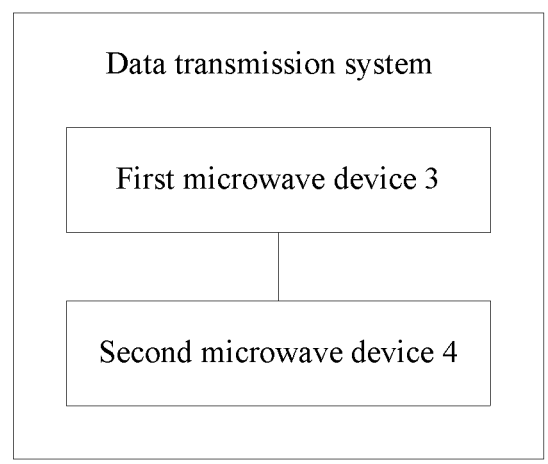
FIG. 18 is a schematic structural diagram of a data transmission system according to an embodiment of the present invention.

This embodiment of the present invention provides a data transmission system. As shown in FIG. 18, the data transmission system includes a first microwave device 3 and a second microwave device 4.

In the data transmission system provided in this embodiment of the present invention, the first microwave device 3 performs corresponding steps in the data sending and receiving method process of the embodiment described in any one of FIG. 6A and FIG. 6B, FIG. 8A and FIG. 8B, FIG. 9A and FIG. 9B, FIG. 10A and FIG. 10B, or FIG. 11A and FIG. 11B, to complete the data sending and receiving method in the embodiment of the present invention. Correspondingly, the second microwave device 4 performs corresponding steps in the data sending and receiving method process of the embodiment described in any one of FIG. 6A and FIG. 6B, FIG. 8A and FIG. 8B, FIG. 9A and FIG. 9B, FIG. 10A and FIG. 10B, or FIG. 11A and FIG. 11B, to complete the data sending and receiving method in the embodiment of the present invention.

This embodiment of the present invention provides the data transmission system. After obtaining a first A×C and a CW, the first microwave device in the system determines a first timeslot in which the first A×C does not carry antenna-carrier I/Q data, and writes a preset synchronization sequence, first information, and a random number in the first timeslot to generate a second A×C, so that power of the second A×C is improved as a whole. In addition, the first microwave device modulates the CW to obtain in-phase/quadrature (I/Q) data of the CW. Then, the first microwave device combines the second A×C with the I/Q data of the CW to generate a microwave air interface frame, and sends the microwave air interface frame in a time division multiplexing manner, so that the second A×C and the I/Q data of the CW can be transmitted through one microwave channel. Because the power of the second A×C is improved as a whole, after the second microwave device that is opposite to the first microwave device receives the microwave air interface frame, an AGC gain of the second microwave device may not increase or decrease sharply, that is, fluctuation in the AGC gain of the second microwave device is reduced, thereby reducing fluctuation in an MSE curve of a microwave link, and improving system performance.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    receiving, by a first microwave device, a common public radio interface (CPRI) frame, and obtaining a control word (CW) and a first antenna-carrier (AxC) from the CPRI frame;
    modulating, by the first microwave device, the CW to obtain in-phase/quadrature (I/Q) data of the CW;
    determining, by the first microwave device, a first timeslot, wherein the first AxC does not carry antenna-carrier I/Q data in the first timeslot;
    writing, by the first microwave device, a preset synchronization sequence, first information, and a random number in the first timeslot to generate a second AxC, wherein the first information comprises a preset channel estimate or a preset radio frequency weighted matrix of the first microwave device; and
    combining, by the first microwave device, the second AxC with the I/Q data of the CW to generate a microwave air interface frame, and sending the microwave air interface frame in a time division multiplexing manner.

2. The method according to claim 1, wherein the CW comprises a preset timeslot identifier, the preset timeslot identifier comprises a first timeslot identifier or a second timeslot identifier, the first timeslot identifier indicates the first timeslot, the second timeslot identifier indicates a second timeslot, and the first AxC carries antenna-carrier I/Q data in the second timeslot; and
    wherein determining, by the first microwave device, the first timeslot comprises:
        extracting, by the first microwave device, the preset timeslot identifier from the CW; and
        determining, by the first microwave device, the first timeslot according to the preset timeslot identifier.

3. The method according to claim 1, wherein determining, by the first microwave device, the first timeslot comprises:
    computing, by the first microwave device, an attribute of the first AxC, wherein the attribute comprises power or a frequency spectrum of the first AxC;
    determining, by the first microwave device, a starting location of the first timeslot, wherein the starting location of the first timeslot is a moment at which a value of the attribute is less than a second preset threshold; and
    determining, by the first microwave device, the first timeslot according to a preset uplink-downlink subframe configuration and the starting location of the first timeslot.

4. The method according to claim 3, wherein the attribute is power; and wherein determining, by the first microwave device, the starting location of the first timeslot comprises:
        determining, by the first microwave device, whether a value of the power is less than a third preset threshold, wherein the third preset threshold is greater than the second preset threshold;
        when the value of the power is less than the third preset threshold, recording, by the first microwave device, a first moment, and computing power of n consecutive pieces of data starting from the first moment in the first AxC, wherein at the first moment the value of the power is less than the third preset threshold, and n is a positive integer;
        determining, by the first microwave device, whether power values of the n consecutive pieces of data are less than the second preset threshold; and
        when the power values of the n consecutive pieces of data are less than the second preset threshold, determining, by the first microwave device, the starting location of the first timeslot, wherein the starting location of the first timeslot is a moment in a first time period, and wherein the first time period is a time period starting from a first piece of data to a last piece of data in the n consecutive pieces of data.

5. A method, comprising:
    receiving, by a second microwave device, a microwave air interface frame from a microwave air interface;
    obtaining, by the second microwave device, a second antenna-carrier (AxC) and in-phase/quadrature (I/Q) data of a control word (CW) from the microwave air interface frame, wherein the second AxC comprises first information and a preset synchronization sequence, and the first information comprises a preset channel estimate or a preset radio frequency weighted matrix of a first microwave device;
    demodulating, by the second microwave device, the I/Q data of the CW to generate the CW;
    performing, by the second microwave device, autocorrelation computation on the second AxC using the preset synchronization sequence, and extracting the first information to generate a first AxC; and
    recombining, by the second microwave device, the CW and the first AxC to generate a common public radio interface (CPRI) frame, and sending the CPRI frame.

6. The method according to claim 5, wherein the first information comprises the preset channel estimate.

7. The method according to claim 6, wherein the first information comprises the preset radio frequency weighted matrix of the first microwave device.

8. The method according to claim 6, wherein the microwave air interface frame is transmitted by the first microwave device to the second microwave device.

9. A microwave device, comprising:
    computing hardware; and
    a non-transitory computer-readable storage medium including computer-executable instructions, wherein the computing hardware is configured to execute the instructions to:
        receive, using a receiver of the microwave device, a common public radio interface (CPRI) frame, and obtain a control word (CW) and a first antenna-carrier (AxC) from the CPRI frame;
        modulate the CW to obtain in-phase/quadrature (I/Q) data of the CW;
        determine a first timeslot, wherein the first AxC does not carry antenna-carrier I/Q data in the first timeslot;

write a preset synchronization sequence, first information, and a random number in the first timeslot to generate a second A×C, wherein the first information comprises a preset channel estimate or a preset radio frequency weighted matrix of the microwave device; and combine the second A×C with the I/Q data of the CW to generate a microwave air interface frame, and send the microwave air interface frame in a time division multiplexing manner.

10. The microwave device according to claim 9, wherein the CW comprises a preset timeslot identifier, the preset timeslot identifier comprises a first timeslot identifier or a second timeslot identifier, the first timeslot identifier indicates the first timeslot, the second timeslot identifier indicates a second timeslot, and the first A×C carries antenna-carrier I/Q data in the second timeslot; and wherein the computing hardware is further configured to execute the instructions to:
extract the preset timeslot identifier from the CW; and
determine the first timeslot according to the preset timeslot identifier.

11. The microwave device according to claim 9, wherein the computing hardware being configured to execute the instructions to determine a first timeslot comprises the computing hardware being configured to execute the instructions to:

compute an attribute of the first A×C, wherein the attribute comprises power or a frequency spectrum of the first A×C;

determine a starting location of the first timeslot, wherein the starting location of the first timeslot is a moment at which a value of the attribute is less than a second preset threshold; and determine the first timeslot according to a preset uplink-downlink subframe configuration and the starting location of the first timeslot.

12. The microwave device according to claim 11, wherein the attribute is power; and wherein the computing hardware being configured to execute the instructions to determine a starting location of the first timeslot comprises the computing hardware being configured to execute the instructions to:
determine whether a value of the power is less than a third preset threshold, wherein the third preset threshold is greater than the second preset threshold;
when the value of the power is less than the third preset threshold, record a first moment, and compute power of n consecutive pieces of data starting from the first moment in the first A×C, the value of the power is less than the third preset threshold at the first moment, and n is a positive integer;
determine whether power values of the n consecutive pieces of data are less than the second preset threshold; and
when the power values of the n consecutive pieces of data are less than the second preset threshold, determine the starting location of the first timeslot, wherein the starting location of the first timeslot is a moment in a first time period, and wherein the first time period starts from a first piece of data to a last piece of data in the n consecutive pieces of data.

13. A microwave device, comprising:

computing hardware; and a non-transitory computer-readable storage medium including computer-executable instructions, wherein the computing hardware is configured to execute the instructions to:

receive, using a receiver, a microwave air interface frame from a microwave air interface;

obtain a second antenna-carrier (A×C) and in-phase/quadrature (I/Q) data of a control word (CW) from the microwave air interface frame, wherein the second A×C comprises first information and a preset synchronization sequence, and the first information comprises a preset channel estimate or a preset radio frequency weighted matrix of another microwave device;

demodulate the I/Q data of the CW to generate the CW;

perform autocorrelation computation on the second A×C using the preset synchronization sequence, and extract the first information to generate a first A×C; and recombine the CW and the first A×C to generate a common public radio interface (CPRI) frame, and send the CPRI frame.

14. The microwave device according to claim 13, wherein the first information comprises the preset channel estimate.

15. The microwave device according to claim 13, wherein the first information comprises the preset radio frequency weighted matrix of the another microwave device.

16. The microwave device according to claim 13, wherein the microwave air interface frame is transmitted by the another microwave device to the microwave device.

* * * * *